(12) United States Patent
Rae et al.

(10) Patent No.: US 10,010,769 B2
(45) Date of Patent: *Jul. 3, 2018

(54) GOLF CLUB HEAD

(71) Applicant: SRI SPORTS LIMITED, Kobe-shi, Hyogo (JP)

(72) Inventors: John J. Rae, Westminster, CA (US); Nathaniel J. Radcliffe, Huntington Beach, CA (US); Daniel J. Stone, Long Beach, CA (US); Trent E. Garner, Champaign, IL (US); Brad S. Hooley, Huntington Beach, CA (US); Robert J. Horacek, Hermosa Beach, CA (US); Sam G. Lacey, Huntington Beach, CA (US); Jeff D. Brunski, Newport Beach, CA (US); Kevin Schaeffer, Vienna, VA (US); Scott A. Carlyle, Huntington Beach, CA (US); Stephen C. Chien, Irvine, CA (US); Craig R. Schnell, Carlsbad, CA (US); Douglas E. Roberts, Carlsbad, CA (US); Dan S. Nivanh, Huntington Beach, CA (US); Michael J. Wallans, Huntington Beach, CA (US)

(73) Assignee: SRI SPORTS LIMITED, Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/385,204

(22) Filed: Dec. 20, 2016

(65) Prior Publication Data

US 2017/0100647 A1  Apr. 13, 2017

Related U.S. Application Data

(63) Continuation of application No. 14/271,064, filed on May 6, 2014, now Pat. No. 9,561,405, which is a
(Continued)

(51) Int. Cl.
*A63B 53/04* (2015.01)

(52) U.S. Cl.
CPC .. *A63B 53/0466* (2013.01); *A63B 2053/0408* (2013.01); *A63B 2053/0437* (2013.01)

(58) Field of Classification Search
USPC .................................................. 473/324–350
See application file for complete search history.

(56) References Cited

U.S. PATENT DOCUMENTS

| D208,058 S | 7/1967 | Johnston |
|---|---|---|
| 3,693,978 A | 9/1972 | East |

(Continued)

FOREIGN PATENT DOCUMENTS

| AU | 9514840 A | 9/1995 |
|---|---|---|
| CN | 1836759 A | 9/2006 |

(Continued)

OTHER PUBLICATIONS

Apr. 14, 2010 Office Action issued in U.S. Appl. No. 11/808,238.
(Continued)

*Primary Examiner* — Alvin Hunter
(74) *Attorney, Agent, or Firm* — Oliff PLC

(57) ABSTRACT

An exemplary golf club head having an increased amount of discretionary mass may be realized by utilizing improved drop angles, an improved average crown height, and/or articulation points. The discretionary mass may be placed low and deep in the club head to improve the location of the center of gravity as well as the inertial properties. A preferred break length may also be utilized to further improve the depth of the center of gravity. In one example, the center of gravity may be positioned to substantially align the sweet spot with the face center of the club head.

16 Claims, 26 Drawing Sheets

Related U.S. Application Data continuation of application No. 13/963,725, filed on Aug. 9, 2013, now Pat. No. 8,753,229, which is a continuation of application No. 12/840,771, filed on Jul. 21, 2010, now Pat. No. 8,529,369, which is a continuation of application No. 12/332,998, filed on Dec. 11, 2008, now Pat. No. 7,789,773, which is a continuation of application No. 11/717,107, filed on Mar. 13, 2007, now Pat. No. 7,500,926.

(60) Provisional application No. 60/876,537, filed on Dec. 22, 2006.

(56) References Cited

U.S. PATENT DOCUMENTS

| | | |
|---|---|---|
| 4,602,787 A | 7/1986 | Sugioka et al. |
| 4,762,322 A | 8/1988 | Molitor et al. |
| 4,867,458 A | 9/1989 | Sumikawa et al. |
| 5,000,454 A | 3/1991 | Soda |
| 5,141,230 A | 8/1992 | Antonious |
| 5,295,689 A | 3/1994 | Lundberg |
| 5,322,206 A | 6/1994 | Harada et al. |
| 5,346,217 A | 9/1994 | Tsuchiya et al. |
| 5,362,055 A | 11/1994 | Rennie |
| 5,397,127 A | 3/1995 | Kawada et al. |
| 5,419,559 A | 5/1995 | Melanson et al. |
| 5,429,357 A | 7/1995 | Kobayashi |
| 5,499,814 A | 3/1996 | Lu |
| 5,518,240 A | 5/1996 | Igarashi |
| 5,624,331 A | 4/1997 | Lo et al. |
| 5,628,698 A | 5/1997 | Sumitomo |
| 5,669,827 A | 9/1997 | Nagamoto |
| 5,669,828 A | 9/1997 | Schmidt |
| 5,704,850 A | 1/1998 | Shieh |
| 5,749,795 A | 5/1998 | Schmidt et al. |
| 5,755,627 A | 5/1998 | Yamazaki et al. |
| 5,803,827 A | 9/1998 | Kuykendall |
| RE35,955 E | 11/1998 | Lu |
| 5,839,975 A | 11/1998 | Lundberg |
| 5,871,408 A | 2/1999 | Chen |
| 5,888,148 A | 3/1999 | Allen |
| 5,935,020 A | 8/1999 | Stites et al. |
| 5,941,782 A | 8/1999 | Cook |
| 5,944,620 A | 8/1999 | Elmer |
| 5,961,394 A | 10/1999 | Minabe |
| 5,980,394 A | 11/1999 | Domas |
| 6,001,029 A | 12/1999 | Kobayashi |
| 6,007,435 A | 12/1999 | Chern |
| 6,017,280 A | 1/2000 | Hubert |
| 6,048,278 A | 4/2000 | Meyer et al. |
| 6,074,310 A | 6/2000 | Ota |
| 6,139,446 A | 10/2000 | Wanchena |
| 6,146,286 A | 11/2000 | Masuda |
| 6,162,133 A | 12/2000 | Peterson |
| 6,168,537 B1 | 1/2001 | Ezawa |
| 6,193,614 B1 | 2/2001 | Sasamoto et al. |
| 6,238,300 B1 | 5/2001 | Igarashi |
| 6,238,302 B1 | 5/2001 | Helmstetter et al. |
| 6,248,026 B1 | 6/2001 | Wanchena |
| 6,254,494 B1 | 7/2001 | Hasebe et al. |
| 6,306,048 B1 | 10/2001 | McCabe et al. |
| 6,331,149 B1 | 12/2001 | Mikame et al. |
| 6,338,683 B1 | 1/2002 | Kosmatka |
| 6,340,337 B2 | 1/2002 | Hasebe et al. |
| 6,344,002 B1 | 2/2002 | Kajita |
| 6,348,013 B1 | 2/2002 | Kosmatka |
| 6,350,209 B1 | 2/2002 | Chen |
| 6,354,961 B1 | 3/2002 | Allen |
| 6,354,963 B1 | 3/2002 | Kodama et al. |
| 6,390,933 B1 | 5/2002 | Galloway et al. |
| 6,406,378 B1 | 6/2002 | Murphy et al. |
| 6,435,982 B1 | 8/2002 | Galloway et al. |
| 6,471,603 B1 | 10/2002 | Kosmatka |
| 6,471,604 B2 | 10/2002 | Hocknell et al. |
| 6,491,592 B2 | 12/2002 | Cackett et al. |
| 6,524,197 B2 | 2/2003 | Boone |
| 6,530,847 B1 | 3/2003 | Antonious |
| 6,565,452 B2 | 5/2003 | Helmstetter et al. |
| 6,572,489 B2 | 6/2003 | Miyamoto et al. |
| 6,572,491 B2 | 6/2003 | Hasebe et al. |
| 6,575,845 B2 | 6/2003 | Galloway et al. |
| 6,592,466 B2 | 7/2003 | Helmstetter et al. |
| 6,595,057 B2 | 7/2003 | Bissonnette et al. |
| 6,623,374 B1 | 9/2003 | Helmstetter et al. |
| 6,648,773 B1 | 11/2003 | Evans |
| 6,663,504 B2 | 12/2003 | Hocknell et al. |
| 6,663,506 B2 | 12/2003 | Nishimoto et al. |
| 6,669,557 B2 | 12/2003 | Adams et al. |
| 6,669,578 B1 | 12/2003 | Evans |
| 6,679,786 B2 | 1/2004 | McCabe |
| 6,716,114 B2 | 4/2004 | Nishio |
| 6,719,645 B2 | 4/2004 | Kouno |
| 6,723,005 B2 | 4/2004 | Hueber |
| 6,729,971 B2 | 5/2004 | Caldwell |
| 6,749,524 B1 | 6/2004 | Chen |
| 6,776,726 B2 | 8/2004 | Sano |
| 6,780,124 B2 | 8/2004 | Lu |
| 6,783,465 B2 | 8/2004 | Matsunaga |
| 6,783,466 B2 | 8/2004 | Seki et al. |
| 6,821,214 B2 | 11/2004 | Rice |
| 6,832,961 B2 | 12/2004 | Sano |
| 6,875,126 B2 | 4/2005 | Yabu |
| 6,875,130 B2 | 4/2005 | Nishio |
| 6,899,637 B2 | 5/2005 | Caldwell |
| 6,913,546 B2 | 7/2005 | Kakiuchi |
| 6,929,565 B2 | 8/2005 | Nakahara et al. |
| 6,939,247 B1 | 9/2005 | Schweigert et al. |
| 6,942,581 B2 | 9/2005 | Kim et al. |
| 6,945,876 B2 | 9/2005 | Nakahara et al. |
| 6,960,141 B2 | 11/2005 | Noguchi et al. |
| 6,984,180 B2 | 1/2006 | Hasebe |
| 7,008,332 B2 | 3/2006 | Liou |
| 7,022,029 B2 | 4/2006 | Caldwell |
| 7,025,693 B2 | 4/2006 | Sugimoto |
| 7,037,214 B2 | 5/2006 | Nakahara et al. |
| 7,056,229 B2 | 6/2006 | Chen |
| 7,059,973 B2 | 6/2006 | Erickson et al. |
| 7,066,835 B2 | 6/2006 | Evans et al. |
| 7,070,512 B2 | 7/2006 | Nishio |
| 7,077,762 B2 | 7/2006 | Kouno et al. |
| 7,101,289 B2 | 9/2006 | Gibbs et al. |
| 7,108,614 B2 | 9/2006 | Lo |
| 7,121,958 B2 | 10/2006 | Cheng et al. |
| 7,128,664 B2 | 10/2006 | Onoda et al. |
| 7,134,972 B2 | 11/2006 | Hsu et al. |
| 7,144,333 B2 | 12/2006 | Murphy et al. |
| 7,147,572 B2 | 12/2006 | Kohno |
| 7,163,468 B2 | 1/2007 | Gibbs et al. |
| 7,166,038 B2 | 1/2007 | Williams et al. |
| 7,169,060 B2 | 1/2007 | Stevens et al. |
| 7,189,165 B2 | 3/2007 | Yamamoto |
| 7,211,005 B2 | 5/2007 | Lindsay |
| 7,214,144 B2 | 5/2007 | Tseng |
| 7,217,199 B2 | 5/2007 | Nakahara et al. |
| 7,255,653 B2 | 8/2007 | Saso |
| 7,258,630 B2 | 8/2007 | Erickson et al. |
| 7,261,645 B2 | 8/2007 | Oyama |
| 7,261,646 B2 | 8/2007 | De Shiell et al. |
| 7,273,419 B2 | 9/2007 | Evans et al. |
| 7,278,927 B2 | 10/2007 | Gibbs et al. |
| 7,281,985 B2 | 10/2007 | Galloway |
| 7,281,993 B2 | 10/2007 | Oyama |
| 7,294,064 B2 | 11/2007 | Tsurumaki et al. |
| 7,297,074 B2 | 11/2007 | Kumamoto |
| 7,300,360 B2 | 11/2007 | Oyama |
| 7,306,527 B2 | 12/2007 | Williams et al. |
| 7,311,613 B2 | 12/2007 | Stevens et al. |
| 7,311,614 B2 | 12/2007 | Kumamoto |
| 7,314,718 B1 | 1/2008 | Dasgupta et al. |
| 7,316,624 B2 | 1/2008 | Sanchez |
| 7,390,269 B2 | 6/2008 | Williams et al. |
| 7,396,291 B2 | 7/2008 | Lo |
| 7,396,297 B2 | 7/2008 | Hirano |

(56) References Cited

U.S. PATENT DOCUMENTS

| | | | |
|---|---|---|---|
| 7,399,237 | B2 | 7/2008 | Evans et al. |
| 7,407,448 | B2 | 8/2008 | Stevens et al. |
| 7,410,428 | B1 | 8/2008 | Dawson et al. |
| 7,413,520 | B1 | 8/2008 | Hocknell et al. |
| 7,422,528 | B2 | 9/2008 | Gibbs et al. |
| 7,431,667 | B2 | 10/2008 | Vincent et al. |
| 7,438,647 | B1 | 10/2008 | Hocknell |
| 7,455,598 | B2 | 11/2008 | Williams et al. |
| 7,470,200 | B2 | 12/2008 | Sanchez |
| 7,476,161 | B2 | 1/2009 | Williams et al. |
| 7,488,261 | B2 | 2/2009 | Cackett et al. |
| 7,494,424 | B2 | 2/2009 | Williams et al. |
| 7,500,926 | B2 | 3/2009 | Rae et al. |
| 7,513,835 | B2 | 4/2009 | Belmont |
| 7,559,851 | B2 | 7/2009 | Cackett et al. |
| 7,563,178 | B2 | 7/2009 | Rae et al. |
| 7,568,982 | B2 | 8/2009 | Cackett et al. |
| 7,578,751 | B2 | 8/2009 | Williams et al. |
| 7,588,501 | B2 | 9/2009 | Williams et al. |
| 7,591,737 | B2 | 9/2009 | Gibbs et al. |
| 7,674,189 | B2 | 3/2010 | Beach et al. |
| 7,731,603 | B2 | 6/2010 | Beach et al. |
| 7,789,773 | B2 * | 9/2010 | Rae .................... A63B 53/0466 473/345 |
| 7,854,666 | B2 | 12/2010 | Horacek et al. |
| 8,007,372 | B2 | 8/2011 | Long et al. |
| 8,187,119 | B2 | 5/2012 | Rae et al. |
| 8,465,380 | B2 | 6/2013 | Horacek et al. |
| 8,529,369 | B2 | 9/2013 | Rae et al. |
| 9,561,405 | B2 * | 2/2017 | Rae .................... A63B 53/0466 |
| 2002/0183134 | A1 | 12/2002 | Allen et al. |
| 2003/0032500 | A1 | 2/2003 | Nakahara et al. |
| 2003/0036440 | A1 | 2/2003 | Grim |
| 2003/0083151 | A1 | 5/2003 | Nakahara et al. |
| 2003/0134693 | A1 | 7/2003 | Nakahara et al. |
| 2006/0058114 | A1 | 3/2006 | Evans et al. |
| 2006/0058115 | A1 | 3/2006 | Erickson et al. |
| 2006/0079349 | A1 | 4/2006 | Rae et al. |
| 2006/0154747 | A1 | 7/2006 | Beach |
| 2007/0004531 | A1 | 1/2007 | Galloway et al. |
| 2007/0232408 | A1 | 10/2007 | Horacek et al. |
| 2007/0293345 | A1 | 12/2007 | Serrano et al. |
| 2007/0298906 | A1 | 12/2007 | Oyama |
| 2008/0051210 | A1 | 2/2008 | Park et al. |
| 2008/0051215 | A1 | 2/2008 | Rae et al. |
| 2008/0051218 | A1 | 2/2008 | Rae et al. |
| 2008/0058116 | A1 | 3/2008 | Rae et al. |
| 2008/0176674 | A1 | 7/2008 | Horacek et al. |

FOREIGN PATENT DOCUMENTS

| | | | | |
|---|---|---|---|---|
| EP | 1782908 | A1 | 5/2007 | |
| GB | 2280380 | A | 2/1995 | |
| JP | 53140136 | A | 12/1978 | |
| JP | 01017668 | A | 7/1987 | |
| JP | 6417667 | A | 1/1989 | |
| JP | H06142236 | A | 5/1994 | |
| JP | 08024376 | A | 7/1994 | |
| JP | H06190088 | A | 7/1994 | |
| JP | H06285568 | A | 10/1994 | |
| JP | H06339550 | A | 12/1994 | |
| JP | H06343721 | A | 12/1994 | |
| JP | H07178207 | A | 7/1995 | |
| JP | 10085369 | A | 9/1996 | |
| JP | H09140836 | A | 6/1997 | |
| JP | 11019253 | A | 7/1997 | |
| JP | 11033145 | A | 7/1997 | |
| JP | H09253242 | A | 9/1997 | |
| JP | H10234891 | A | 9/1998 | |
| JP | H10277181 | A | 10/1998 | |
| JP | H10314347 | A | 12/1998 | |
| JP | H10314348 | A | 12/1998 | |
| JP | H11114102 | A | 4/1999 | |
| JP | H11128413 | A | 5/1999 | |
| JP | H11313906 | A | 11/1999 | |
| JP | 2000288133 | A | 10/2000 | |
| JP | 2000300701 | A | 10/2000 | |
| JP | 2000334071 | A | 12/2000 | |
| JP | 2000342721 | A | 12/2000 | |
| JP | 2000342725 | A | 12/2000 | |
| JP | 2001070484 | A | 3/2001 | |
| JP | 2001231888 | A | 8/2001 | |
| JP | 2001231896 | A | 8/2001 | |
| JP | 2001321466 | A | 11/2001 | |
| JP | 03313653 | B2 | 8/2002 | |
| JP | 2002301174 | A | 10/2002 | |
| JP | 2003052874 | A | 2/2003 | |
| JP | 2003230641 | A | 8/2003 | |
| JP | 2003265656 | A | 9/2003 | |
| JP | 2004174224 | A | 6/2004 | |
| JP | 2004351054 | A | 12/2004 | |
| JP | 2005040232 | A | 2/2005 | |
| JP | 2005130935 | A | 5/2005 | |
| JP | 2006094965 | A | 4/2006 | |
| JP | 2007097848 | A | 4/2007 | |
| JP | 2007289332 | A | 11/2007 | |
| JP | 04082574 | B2 | 4/2008 | |
| JP | 2008154999 | A * | 7/2008 | ......... A63B 53/0466 |
| JP | 2008188280 | A | 8/2008 | |
| JP | 2012148138 | A * | 8/2012 | ......... A63B 53/0466 |
| TW | 469140 | B | 12/2001 | |

OTHER PUBLICATIONS

Dec. 22, 2009 Office Action issued in U.S. Appl. No. 11/808,238.
Jun. 17, 2009 Office Action issued in U.S. Appl. No. 11/808,238.
Oct. 31, 2008 Office Action issued in U.S. Appl. No. 11/808,238.
Jul. 12, 2010 Notice of Allowance issued in U.S. Appl. No. 12/332,998.
Mar. 8, 2010 Office Action issued in U.S. Appl. No. 12/332,998.
Jul. 27, 2009 Office Action issued in U.S. Appl. No. 12/332,998.
Aug. 11, 2010 Office Action issued in U.S. Appl. No. 12/354,585.
Mar. 18, 2010 Office Action issued in U.S. Appl. No. 12/354,585.
Jun. 19, 2009 Office Action issued in U.S. Appl. No. 12/354,585.
Jackson, Jeff. "The Modern Guide to Golf Club Making". p. 239, 1994.
Dec. 23, 2011 Office Action issued in U.S. Appl. No. 12/357,585.
May 6, 2013 Notice of Allowance issued in U.S. Appl. No. 12/840,771.
Dec. 24, 2012 Quayle Action issued in U.S. Appl. No. 12/840,771.
May 25, 2012 Office Action issued in U.S. Appl. No. 12/840,771.
Nov. 17, 2011 Office Action issued in U.S. Appl. No. 12/840,771.
May 23, 2011 Office Action issued in U.S. Appl. No. 12/840,771.
Jun. 23, 2016 Office Action Issued in U.S. Appl. No. 14/271,064.
Jan. 8, 2010 Chinese Office Action issued in Chinese Patent Application No. 200710140860.5.
Jackson, Jeff. "The Modern Guide to Golf Club Making". p. 237, 1994.
Dec. 4, 2008 Notice of Allowance issued in U.S. Appl. No. 12/717,107.
Apr. 17, 2009 Notice of Allowance issued in U.S. Appl. No. 11/808,091.
Nov. 24, 2008 Office Action issued in U.S. Appl. No. 11/808,091.
Jan. 21, 2011 Office Action issued in U.S. Appl. No. 11/808,238.
Oct. 7, 2010 Office Action issued in U.S. Appl. No. 11/808,238.

* cited by examiner

GOLF CLUB HEAD

RELATED U.S. APPLICATION DATA

This is a Continuation of application Ser. No. 14/271,064 filed on May 6, 2014, which is a Continuation of application Ser. No. 13/963,725 filed on Aug. 9, 2013 (now U.S. Pat. No. 8,753,229), which is a Continuation of application Ser. No. 12/840,771 filed on Jul. 21, 2010 (now U.S. Pat. No. 8,529,369), which is a Continuation of application Ser. No. 12/332,998 filed on Dec. 11, 2008 (now U.S. Pat. No. 7,789,773), which is a Continuation of application Ser. No. 11/717,107 filed on Mar. 13, 2007 (now U.S. Pat. No. 7,500,926), which claims priority of Provisional Application No. 60/876,537, filed on Dec. 22, 2006.

The disclosure of each related application is hereby incorporated by reference in its entirety.

BACKGROUND

As technology has progressed, wood-type club heads have evolved from the relatively small persimmon-wood heads to the "oversized" metal club heads typically found in most modern drivers. Despite the changes in size and materials over the years, modern drivers have failed to overcome certain shortcomings historically associated with traditional wood-type clubs.

For a golfer to extract maximum performance from a golf club, a club head having a mass in the range of 180-250 g is generally provided. A certain portion of the club head's mass is reserved for components that provide structural support. The remaining mass, referred to as discretionary mass, may be strategically distributed within the club head to improve the head's inertial properties and to orient the CG in a desired location.

In conventional drivers, favorable placement of the CG and enhancement of the moments of inertia (MOI) are limited by the available amount of discretionary mass. Conventional methods of increasing the discretionary mass, e.g. thinning the club head walls and utilizing light-weight materials, have yielded relatively small gains in available discretionary mass. Conventional drivers have generally failed to realize CG locations and moments of inertia necessary to deliver improved performance due to limited amounts of attainable discretionary mass.

Generally, golfers have a natural tendency to strike the golf ball about the face center of the club head. The face center, in most drivers, is the point on the face where maximum energy transfer occurs at ball impact and is also known as the Coefficient of Restitution (COR) "hot spot". Although ball impact at the COR "hot spot" yields added performance benefits in the form of increased distance, it does not necessarily produce the most accurate ball flight if the COR "hot spot" is not aligned with the impact point on the club face where no head rotation or gear effect occurs, also known as the "sweet spot", which is the orthogonal projection of the club head's center of gravity (CG) onto the striking face of the head. In currently available club heads, the "sweet spot" is generally located above the COR "hot spot" due to the high location of the club head's center of gravity. This unfavorable CG orientation produces a club head where only one of these performance variables, i.e., distance associated with the COR "hot spot" or accuracy associated with the "sweet spot", may be maximized during a single golf shot.

Furthermore, this high "sweet spot" location on the face produces a statistically unfavorable ball contact pattern that results in decreased directional shot consistency. The natural tendency of the golfer to strike the ball about the face center, on average, results in a larger than desired distance between the location of the ball at impact and the "sweet spot". This increased distance exaggerates both the head rotation and gear effect of the club head, causing a loss of carry distance and accuracy.

Shot accuracy and distance are also affected by the depth of the CG relative to the club face. In modern drivers, the CG is typically positioned near the face. This shallow CG placement prevents the club head from dynamically flexing the shaft toward alignment with the CG to loft the head and to close the face at impact with the ball. Additionally, a shallow CG decreases the radius of rotation of the face on off-center hits, thus decreasing shot accuracy.

SUMMARY

Hence, a need exists for a golf club head that provides an increase in discretionary mass, lowers the CG in the club head, increases the depth of the CG in the club head, aligns the CG with the center of the face, and improves the MOI of the club head.

Such benefits may be attained by utilizing drop angles, recovery angles, average heights, and break lengths in accordance with the embodiments of the present invention.

DESCRIPTION

Figure 1:
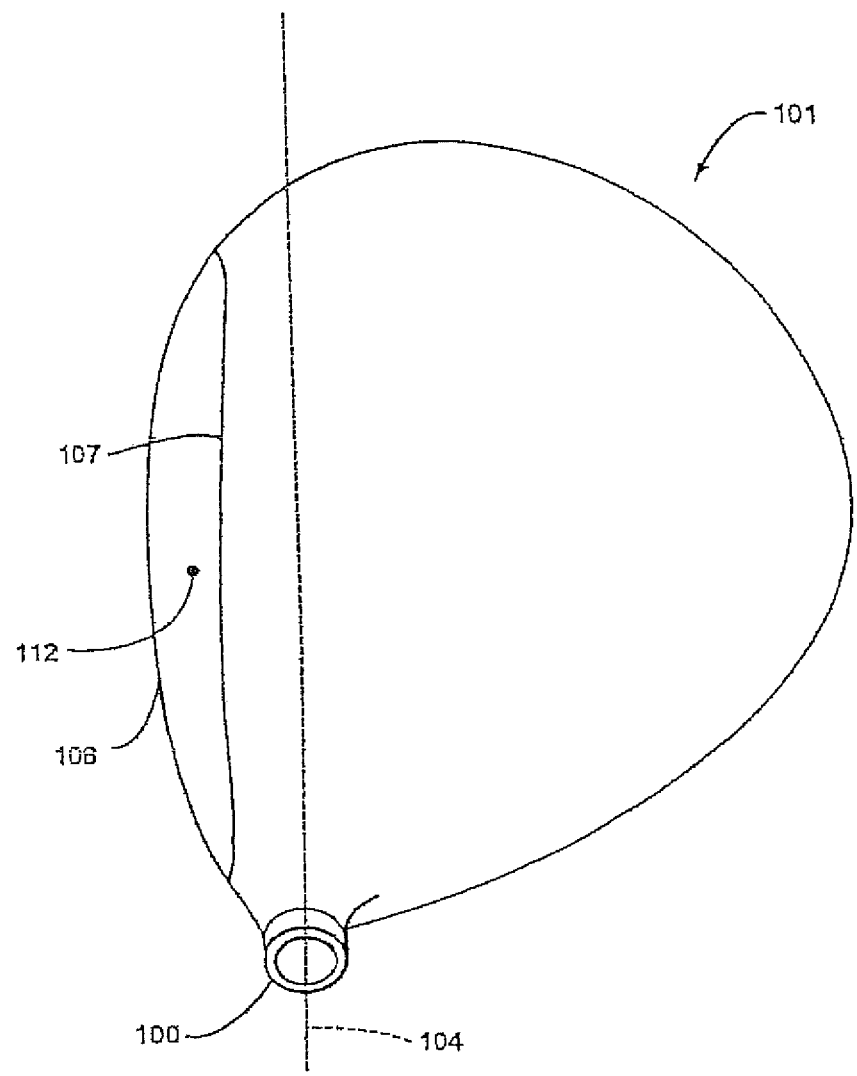
FIG. 1 is a top plan view of an exemplary golf club in accordance with one aspect of the present invention.
Figure 1A:
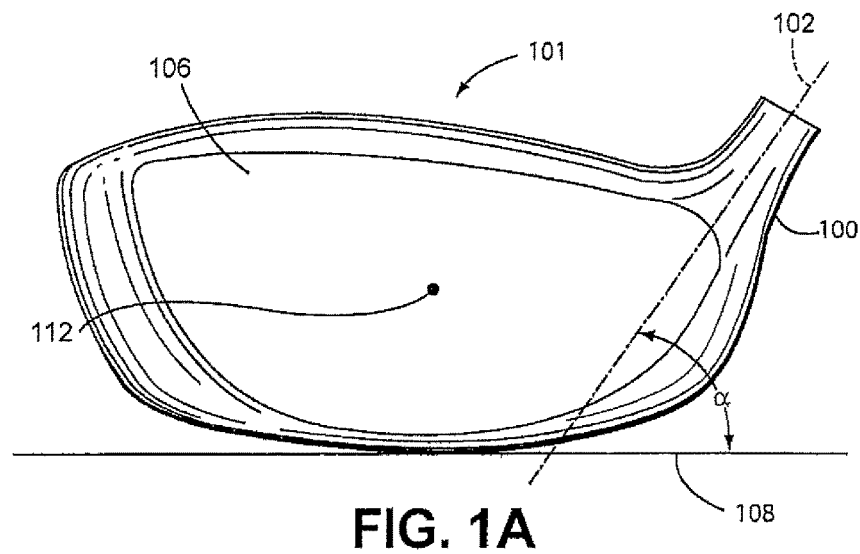
FIG. 1A is a front elevational view of the golf club head of FIG. 1.

Referring to FIGS. 1 and 1A, "reference position," as used herein, denotes a position of the club head 101 where the hosel centerline 102 is in an imaginary vertical plane 104 and is oriented at a lie angle α of 60° with respect to a ground plane 108. The imaginary vertical plane 104 is oriented parallel to the top edge 107 of the face 106. The reference position may be determined in accordance with the United States Golf Association and R&A Rules Limited, "Procedure for Measuring the Club Head Size of Wood Clubs," Revision 1.0, Sections 6.0.1, 6.6, & 6.7 (Nov. 21, 2003). Unless otherwise indicated, all parameters are specified with the club head 101 in the reference position.

Figure 1B:
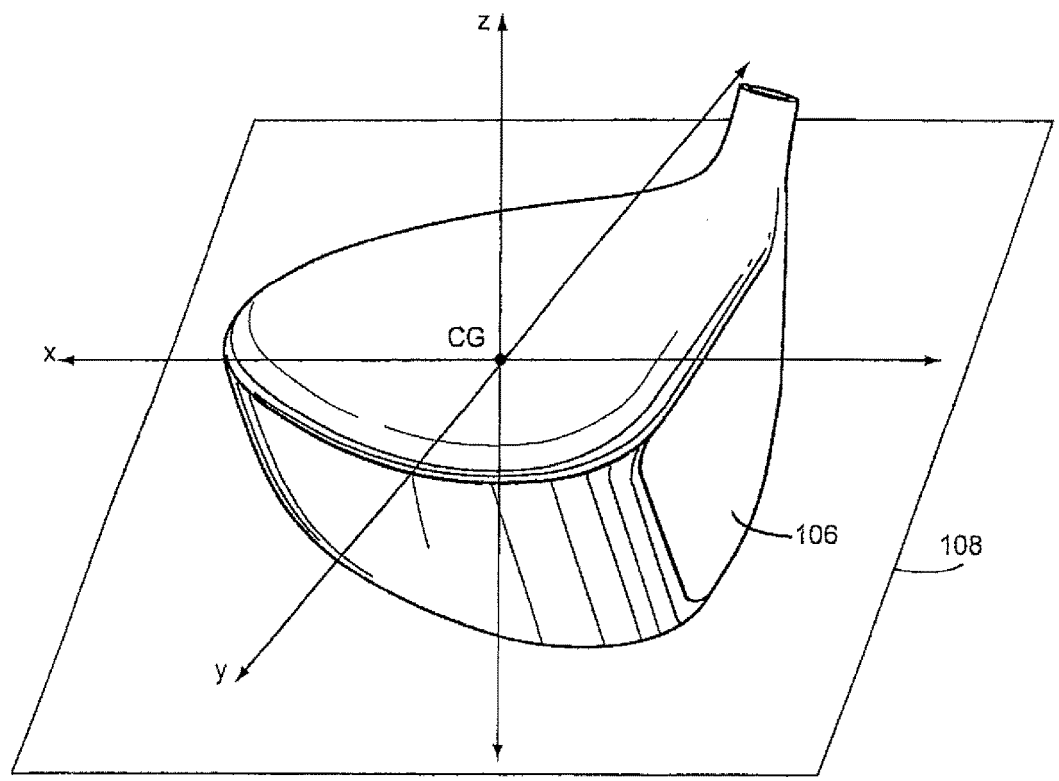
FIG. 1B is a front perspective view of the golf club head of FIG. 1.
Figure 1C:
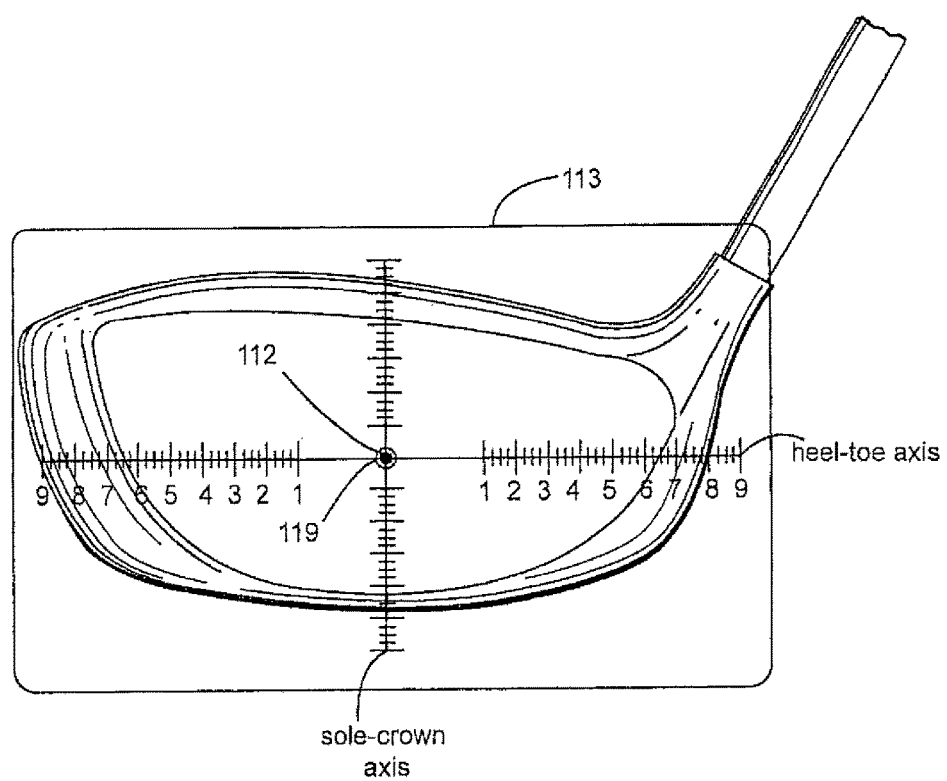
FIG. 1C shows a template for locating the face center of a golf club head.

Referring to FIGS. 1, 1A, and 1C, "face center," e.g., face center 112, as used herein, may be located using the USGA method described in the United States Golf Association's, "Procedure for Measuring the Flexibility of a Golf Club head," Revision 2.0, Section 6.1 (Mar. 25, 2005). As described in the Procedure for Measuring the Flexibility of a Golf Club head, the face center 112 may be located using a template 113, having a coordinate system with a heel-toe axis orthogonal to a sole-crown axis. An aperture 119 may be located at the origin of the coordinate system and each axis may be divided into evenly spaced increments. The template 113 may be composed of a flexible material, e.g., a transparent polymer. The template is used as follows:

(1) The template 113 is placed on the striking surface 111 with the heel-toe axis substantially parallel to the leading edge 107. The template is then moved back and forth in the heel-toe direction along the striking surface 111 until the heel and toe measurements at the opposite edges of the striking surface 111 are equal.

(2) The template 113 is moved back and forth in the sole-crown direction along the striking surface 111 until the sole and crown measurements at the opposite edges of the striking surface 111 are equal.

(3) The template 113 is moved with respect to the striking surface 111 as described in steps 1 and 2, above, until the heel and toe as well as the sole and crown measurements along the corresponding axes are equal. A circle is then marked on the face via the aperture 119 to indicate the face center 112.

Figure 2A:
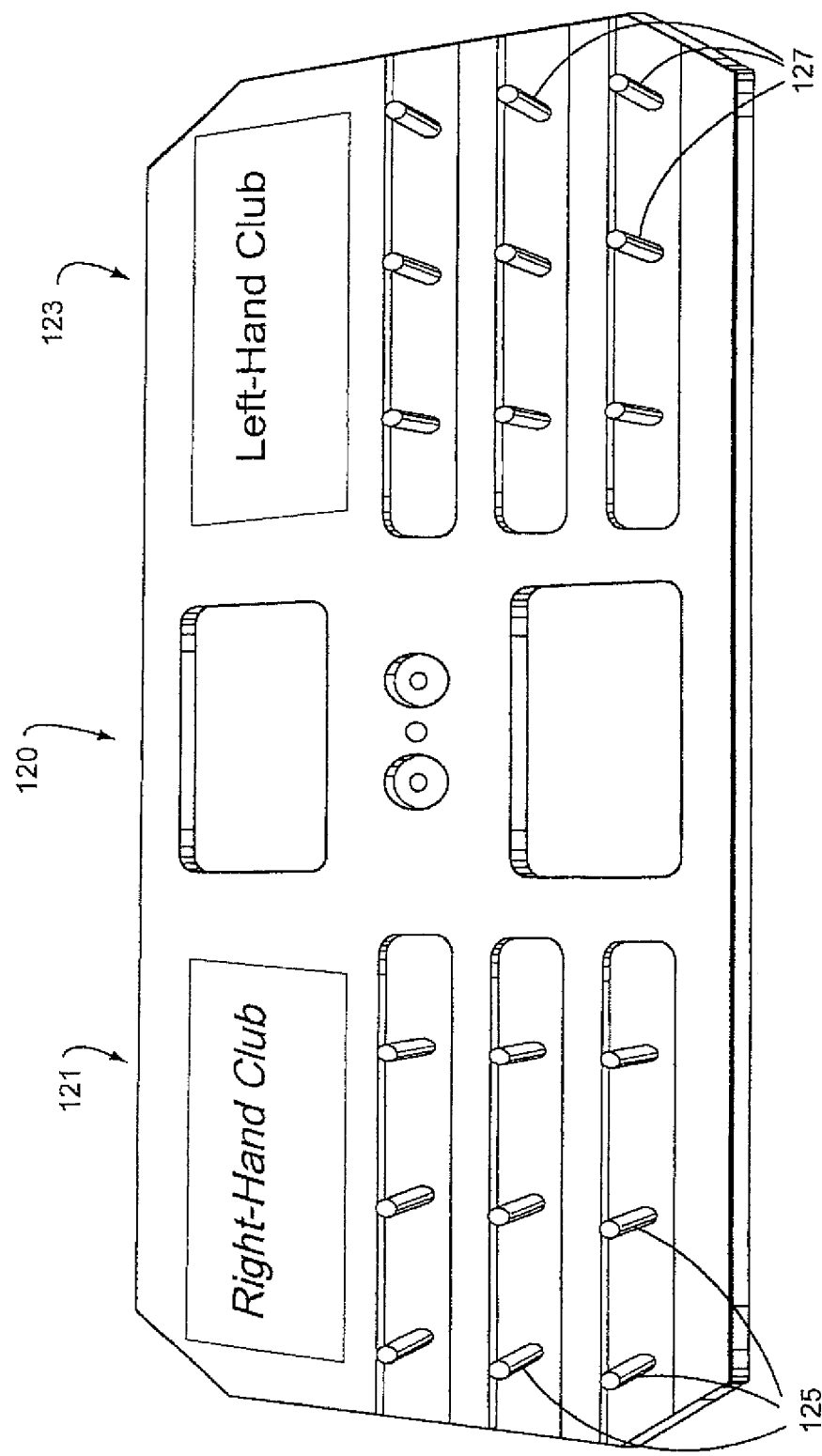
FIG. 2A shows a horizontal jig plate.
Figure 2B:
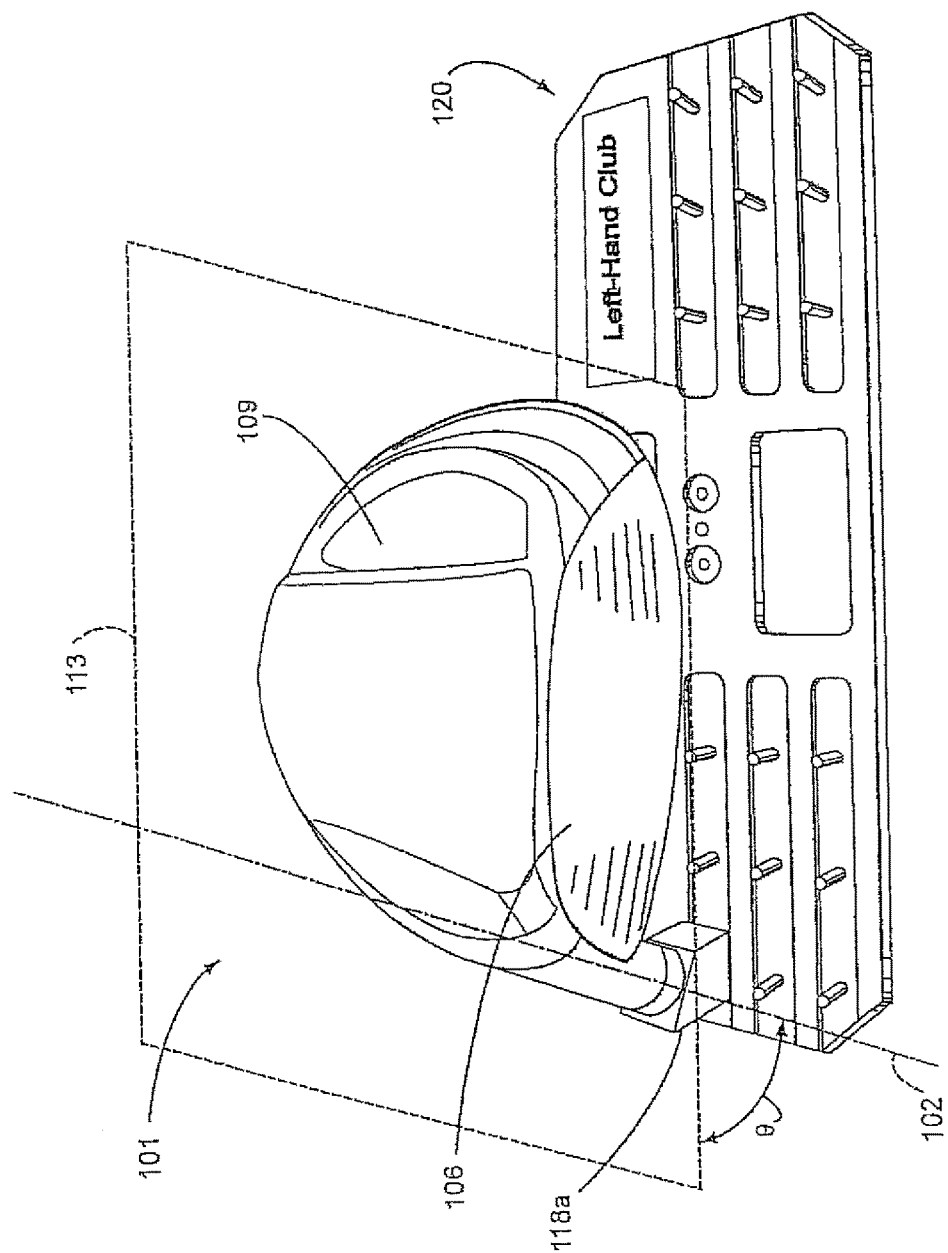
FIG. 2B shows the golf club head of FIG. 1 installed on the horizontal jig plate.

Referring to FIG. 1B, for purposes of determining moments of inertia (MOI) of a golf club 101 according to the various embodiments of the invention, a three-dimensional coordinate system having axes x, y, and z, has its origin at the center of gravity CG of the club head 101 with the club head 101 in the reference position. The Z-axis extends through the CG generally parallel to the strike face 106 in a vertical direction relative to the ground plane 108. The Y-axis extends through the CG substantially parallel to the strike face 106 and perpendicular to the z-axis. The X-axis extends through the CG and is perpendicular to the Z and the Y-axes. The relevant MOIs may be determined as follows:

(1) The MOI about the z-axis ($I_{zz}$) may be determined using the method described in United States Golf Association and R&A Rules Limited, "Procedure for Measuring the Moment of Inertia of Golf Club heads," Revision 1.0 (Apr. 12, 2006). As described in the USGA Procedure for Measuring the Moment of Inertia of Golf Clubheads, a measuring instrument (not shown) designed for determining the moment of inertia of test parts having mass properties and overall dimensions similar to that of a golf club head, may be used to obtain the moment of inertia $I_{zz}$ about the z-axis. Referring to FIGS. 2A and 2B, a horizontal jig plate 120, described in the USGA Procedure for Measuring the Moment of Inertia of Golf Clubheads, is attached to the measuring instrument (not shown), such that the jig plate and the measurement instrument are level.

As shown in FIG. 2A, the jig plate 120 has a first side 121 and a second side 123. The first side 121 includes mounting pins 125 and the second side 123 includes mounting pins 127. Pins 125 and 127 comprise rows arranged longitudinally with respect to the jig plate and columns arranged transversely with respect to the jig plate.

For purposes of measuring the MOI of the club head 101 about the z-axis, an adapter 118a (FIG. 2B) is utilized to orient the club head with respect to the jig plate 120 so that the sole portion 109 of the club head is facing up and the club head 101 is disposed such that the angle θ between the hosel centerline 102 and an imaginary horizontal plane 113 is substantially 60°. Furthermore, the face portion 106 of the club head is substantially parallel to the rows of mounting pins 125 and 127. For purposes of measuring the MOI of the club head 101 about the z-axis, the pins 125 (FIG. 2A) on the first side 121 of the jig plate 120 are used for right-handed club heads and the pins 127 on the second side 123 of the jig plate 120 are used for left-handed club heads.

Figure 2C:
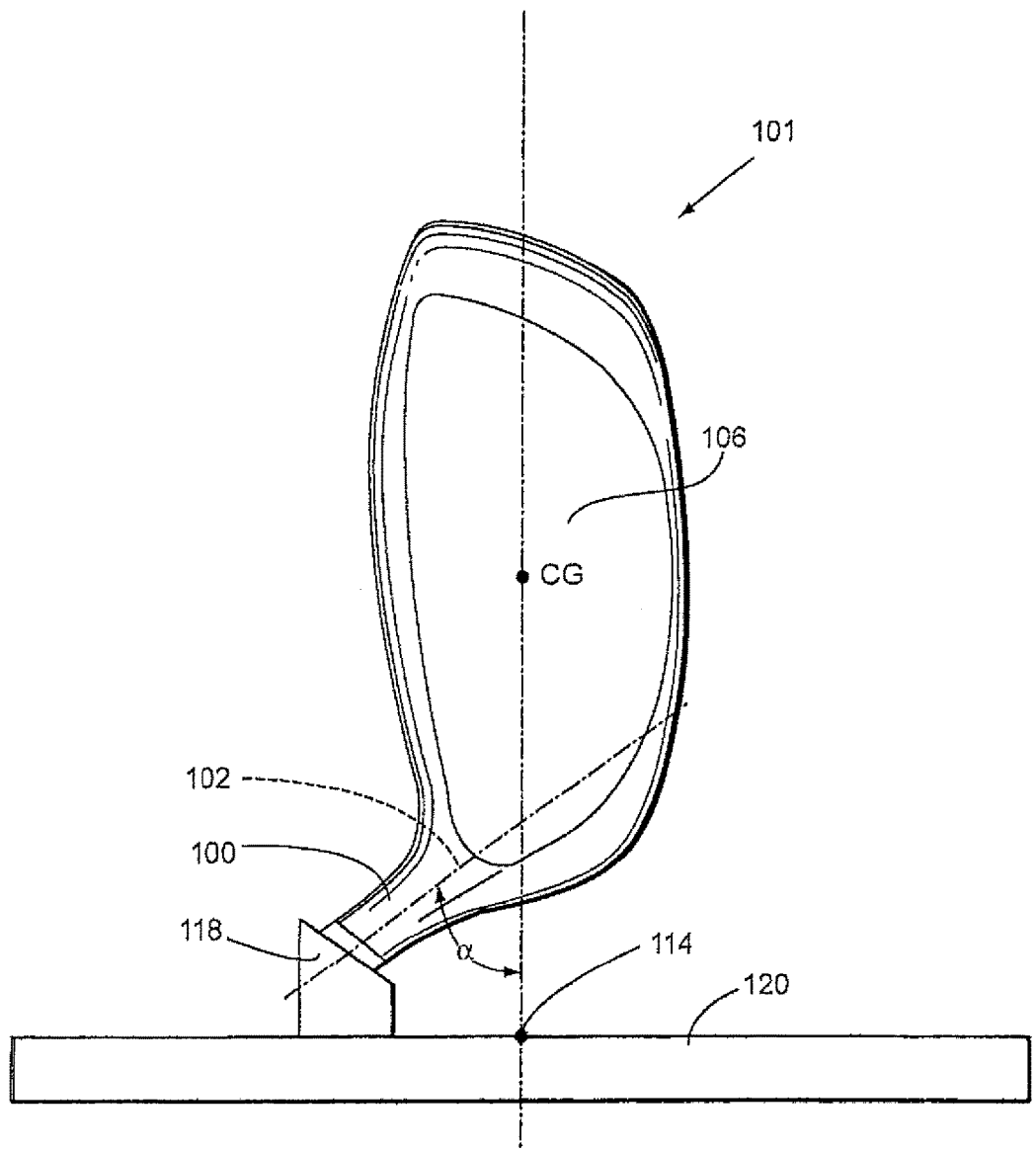
FIG. 2C is a front elevational view of the golf club head of FIG. 1.

(2) The MOI about the y-axis ($I_{yy}$) is determined using a measurement instrument, e.g., model number MOI-005-104 made by Inertia Dynamics, Inc. of Collinsville, Conn., designed for measuring the moment of inertia of test parts having mass properties and overall dimensions similar to that of a golf club head. Referring to FIG. 2C, an exemplary measurement instrument is provided with a horizontal jig plate 120 capable of accommodating a hosel fixture 118. Proper orientation of the club head 101 on the hosel fixture 118 is accomplished by rotating the club head 101, oriented in the reference position, through 90 degrees so that the toe is pointing upward in the vertical direction and the CG of the club head 101 is substantially aligned with the central axis of rotation 114, which is in the vertical direction, of the measuring instrument. These measurements are made using methodologies well known to those skilled in the art.

Figure 3:
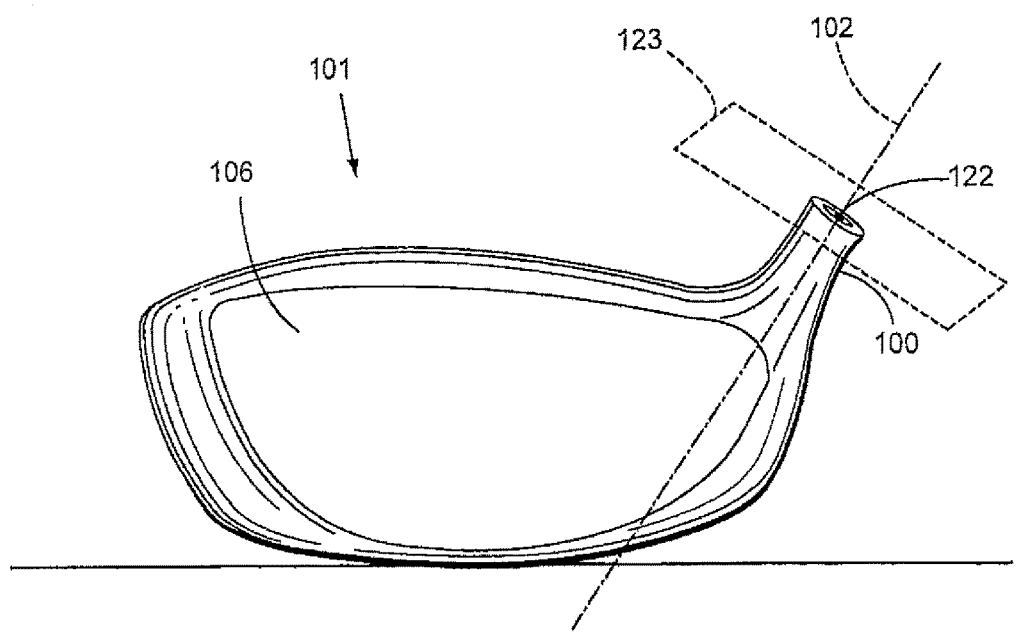
FIG. 3 is a front elevational view of the golf club head of FIG. 1.

Referring to FIG. 3, hosel center 122, as used herein, refers to the point of intersection between a planar surface 123 and the hosel centerline 102. The planar surface 123 is characterized by the end of the hosel 100.

Figure 3A:
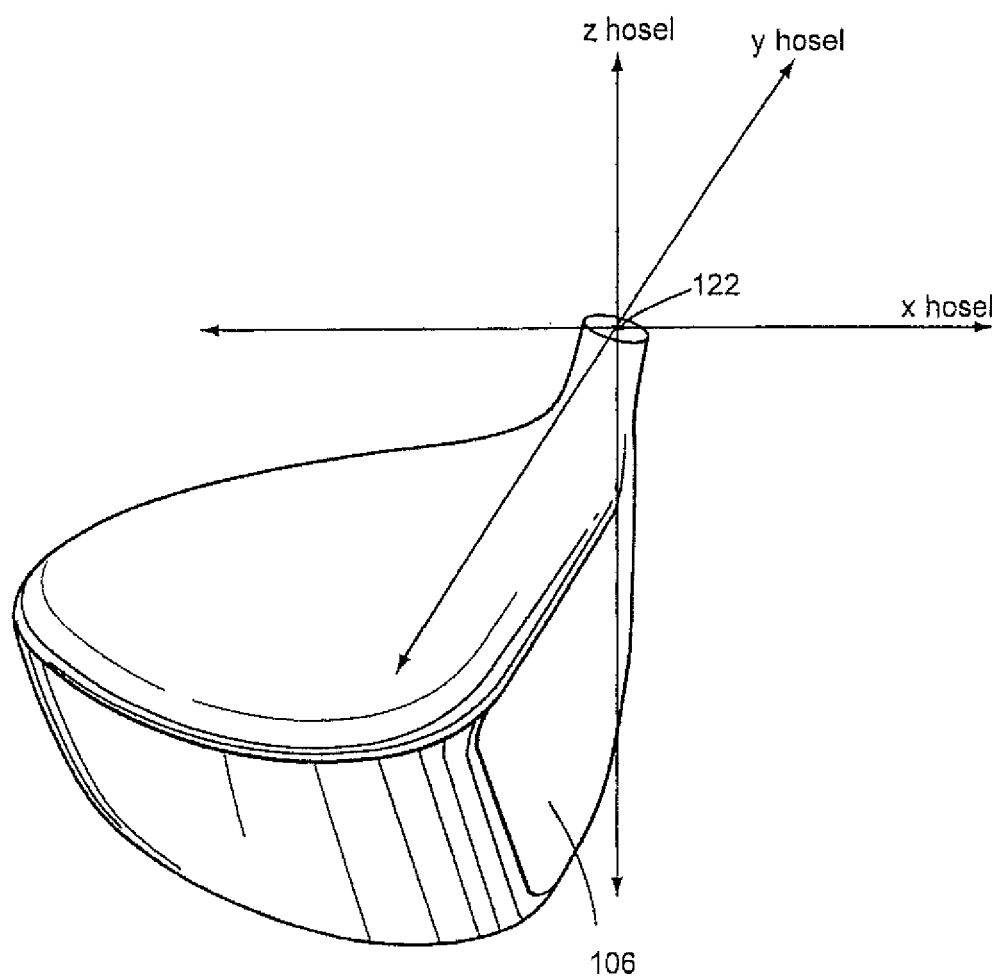
FIG. 3A is a front perspective view of the golf club head of FIG. 1.
Figure 3B:
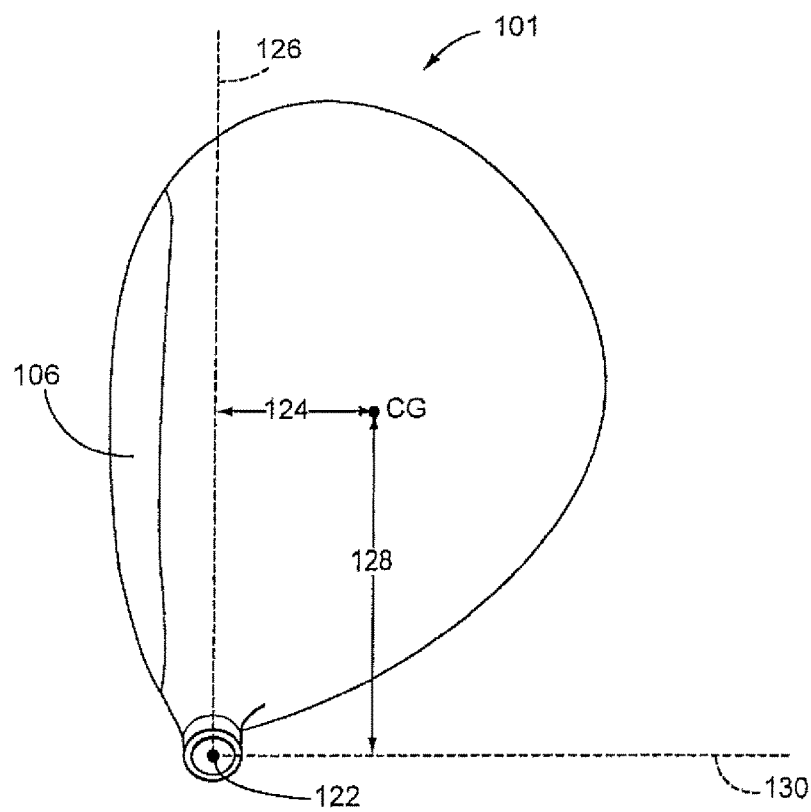
FIG. 3B is a top plan view of the golf club head of FIG. 1

Referring to FIGS. 3 and 3A, for purposes of locating the CG of a golf club head 101 according to the various embodiments of the invention, a second three dimensional coordinate system, including axes $X_{hosel}$, $Y_{hosel}$, and $Z_{hosel}$, has its origin at the hosel center 122, with the club head 101 in the reference position. Axis $Z_{hosel}$ extends through the hosel center 122 generally parallel to the strike face 106 in a vertical direction relative to the ground plane 108. Axis $Y_{hosel}$ extends through the hosel center 122 substantially parallel to the strike face 106 and perpendicular to the $Z_{hosel}$ axis. Axis $X_{hosel}$ extends through the hosel center 122 perpendicular to the $Z_{hosel}$ and $Y_{hose}$ axes. The CG of the club head may be located as follows:

(1) Referring to FIG. 3B, the CG is located a first horizontal distance 124 from an imaginary vertical plane 126. The plane 126 is oriented substantially parallel to the face 106 and passes through the hosel center 122. The distance 124 is the shortest horizontal distance from plane 126 to the CG;

(2) Referring to FIG. 3B, the CG is located a second horizontal distance 128 from an imaginary vertical plane 130. The plane 130 is oriented substantially perpendicular to the face 106 and passes through the hosel center 122. The distance 128 is the shortest horizontal distance from plane 130 to the CG; and (3) Referring to FIG. 3C, the CG is located a first vertical distance 132 from the ground plane 108. The distance 132 is the shortest vertical distance from the ground plane 108 to the CG.

Figure 4:
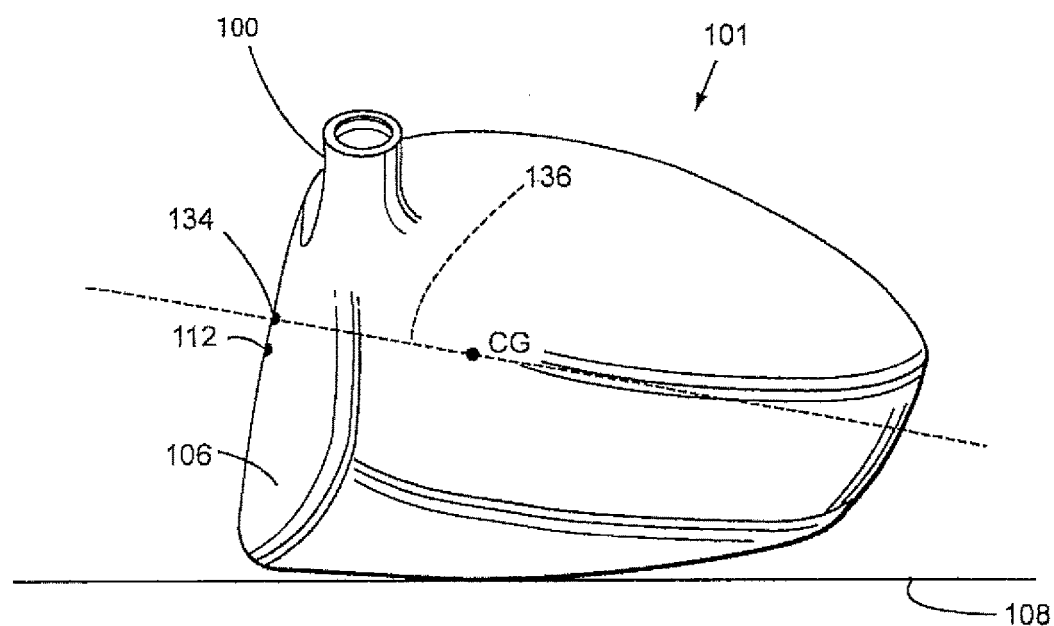
FIG. 4 is a heel side elevational view of the golf club head of FIG. 1.

Referring to FIG. 4, sweet spot 134, as used herein, refers to the point of intersection between the outer surface of the club face 106 and an imaginary line 136 that is substantially perpendicular to the face 106 and passes through the CG of the club head 101.

Figure 5:
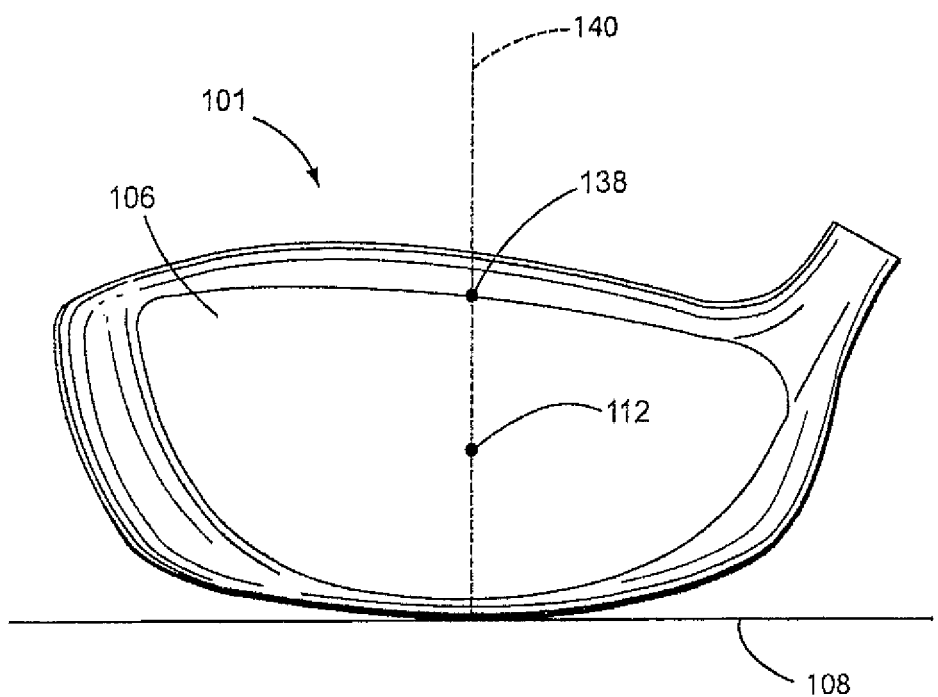
FIG. 5 is a front elevational view of the golf club head of FIG. 1.

Referring to FIG. 5, center apex 138, as used herein, refers to a point of intersection between an imaginary vertical plane 140 and the top of the strike face 106. The plane 140 is oriented substantially perpendicular to the face 106 and passes through the face center 112.

Figure 6:
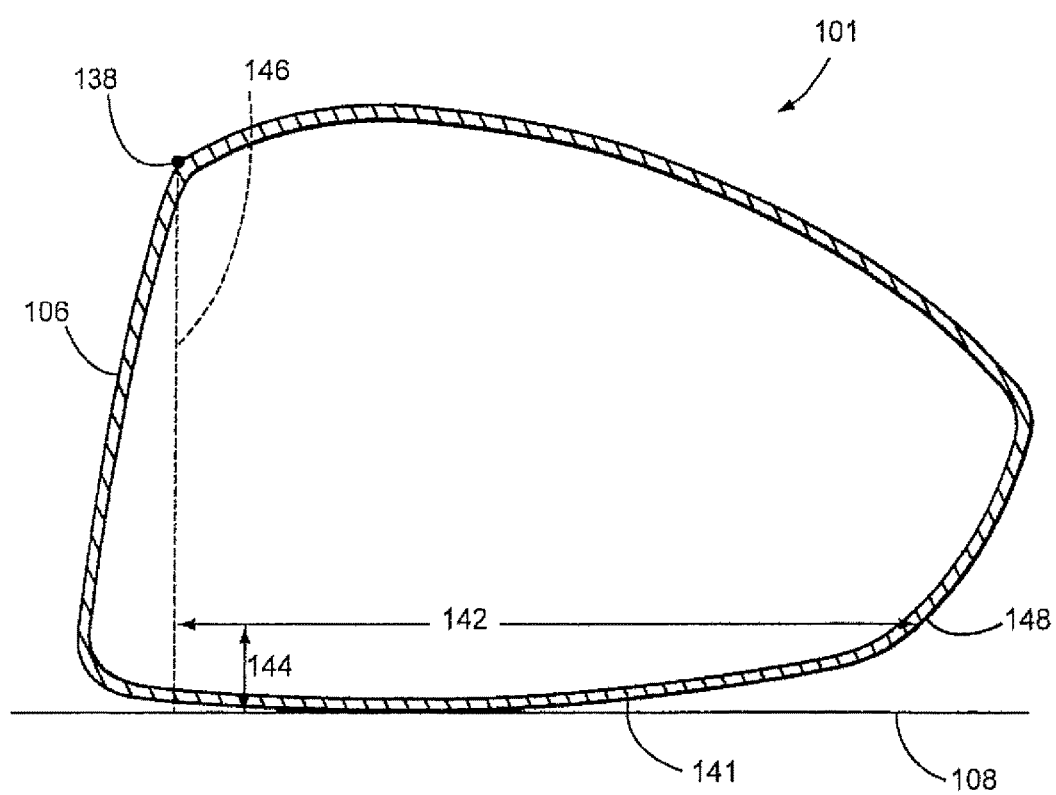
FIG. 6 is a heel side cross-sectional view of the golf club head of FIG. 1.

Referring to FIG. 6, break length 142, as used herein, denotes a horizontal distance, at a height 144 relative to the ground plane 108 in a direction substantially perpendicular to the face 106, between an imaginary vertical line 146 and the outer surface of a rear portion 148 of the club head 101. The imaginary vertical line 146 extends from the center apex 138 to the ground plane 108.

Figure 7:
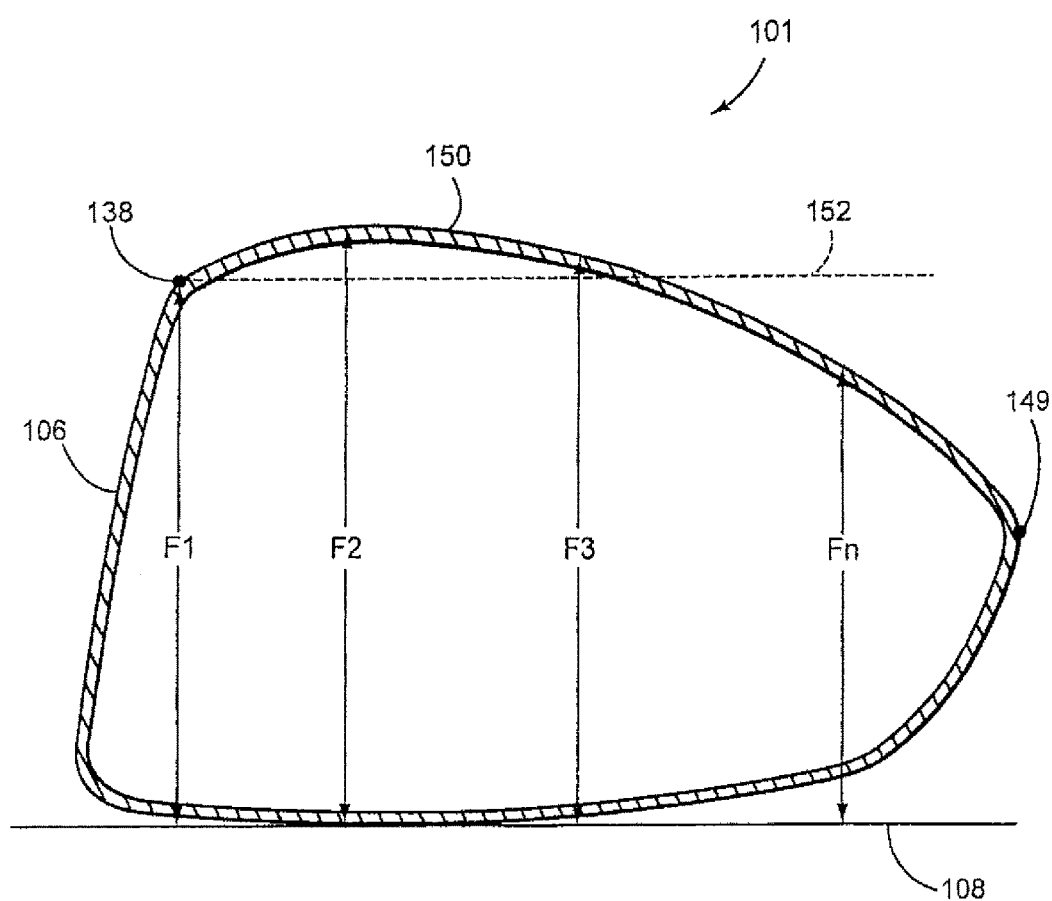
FIG. 7 is a heel side cross-sectional view of the golf club head of FIG. 1.

Referring to FIG. 7, the term "average height", as used herein, denotes an average of a plurality of vertical distances, e.g. $F_1 \ldots F_n$, between a path 174 and the ground plane 108, in a vertical plane containing the center apex 138 and a rear-most point 149 of the club head 101. Vertical distances $F_1 \ldots F_n$ may be spaced anywhere between the apex 138 and the point 149 in horizontal increments having any desired progression, e.g., equal 5 mm increments.

Figure 8:
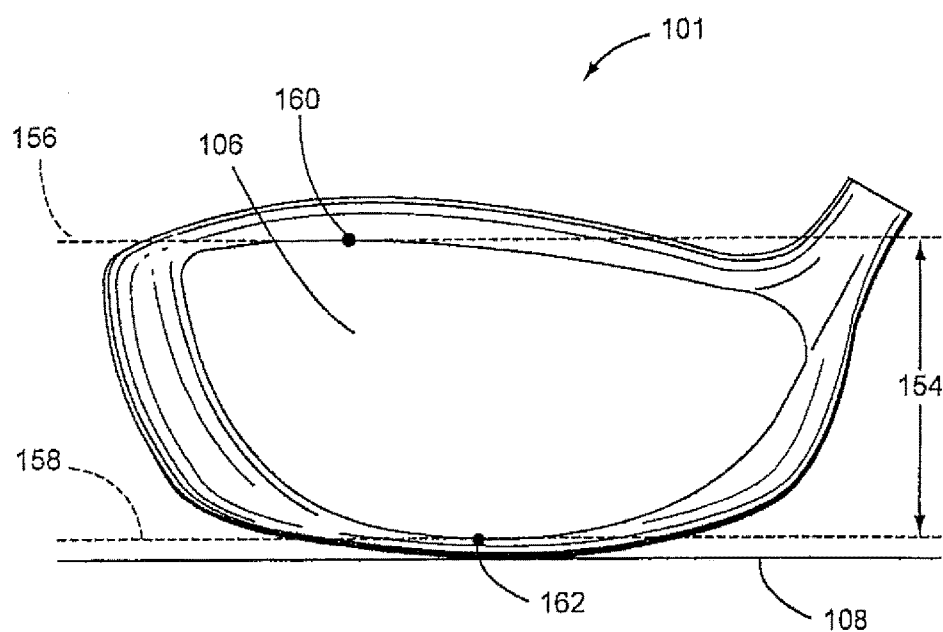
FIG. 8 is a front elevational view of the golf club of FIG. 1.

Referring to FIG. 8, face height 154, as used herein, denotes a vertical distance, with the club head 101 in the reference position, between a first plane 156, parallel to the ground plane 108 and passing through the highest point 160 of the strike face 106, and a second plane 158, parallel to the ground plane 108 and passing through the lowest point 162 of the strike face 106.

Figure 9:
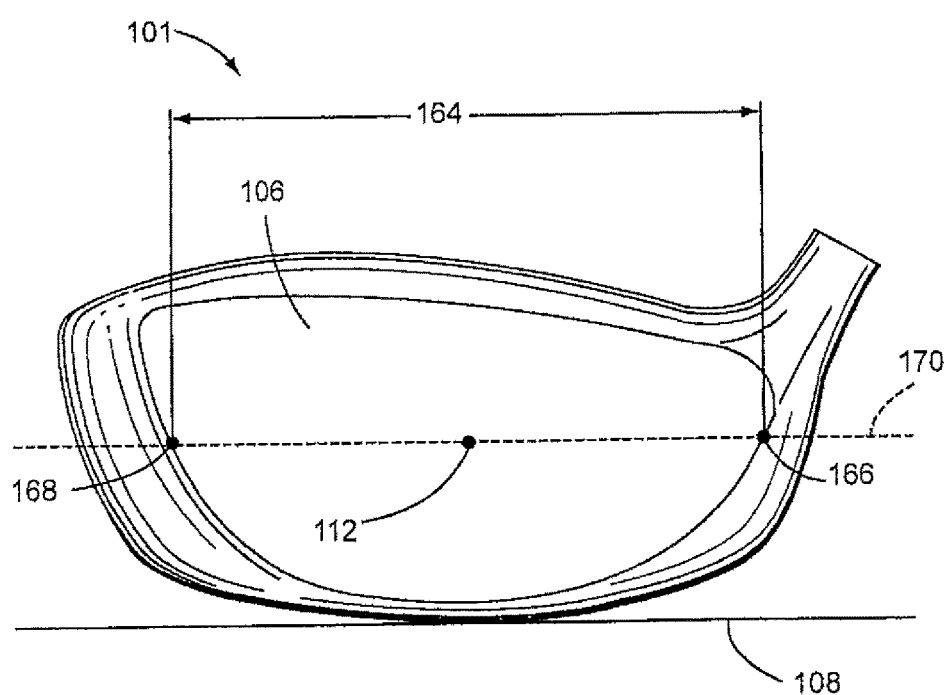
FIG. 9 is a front elevational view of the golf club head of FIG. 1.

Referring to FIG. 9, face length 164, as used herein, refers to a horizontal distance between a heel end 166 and a toe end 168 along a horizontal plane 170 passing through the face center 112.

Figure 10A:
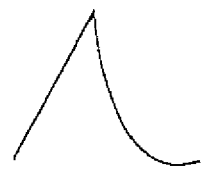
FIGS. 10A-E illustrate a plurality of non-arcuate junctions in accordance with another aspect of the present invention.
Figure 10B:
Figure 10C:
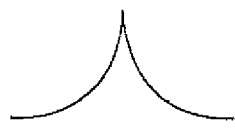
Figure 10D:
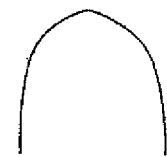
Figure 10E:
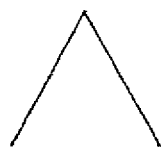

The term "non-arcuate junction", as used herein, refers to a junction of two lines where: an endpoint of an arcuate line meets an endpoint of a straight line (FIGS. 10A and 10B), an endpoint of an arcuate line meets an endpoint of another arcuate line (FIGS. 10C and 10D), or an endpoint of a straight line meets an endpoint of another straight line (FIG. 10E).

Figure 11A:
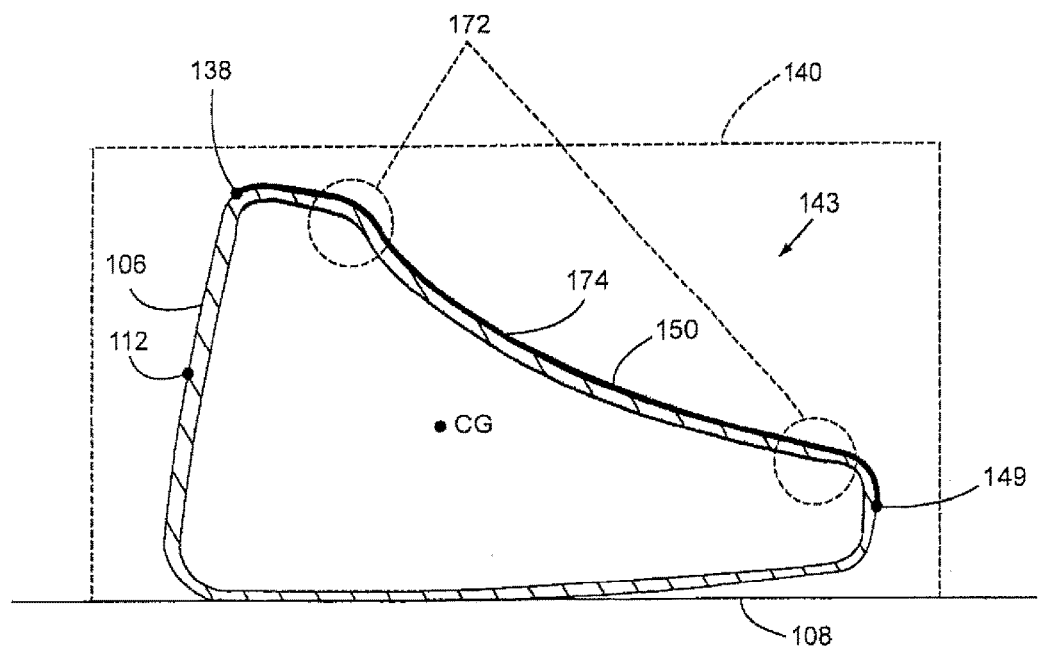
FIG. 11A is a heel side cross-sectional view of an exemplary golf club head in accordance with another aspect of the present invention.
Figure 11B:
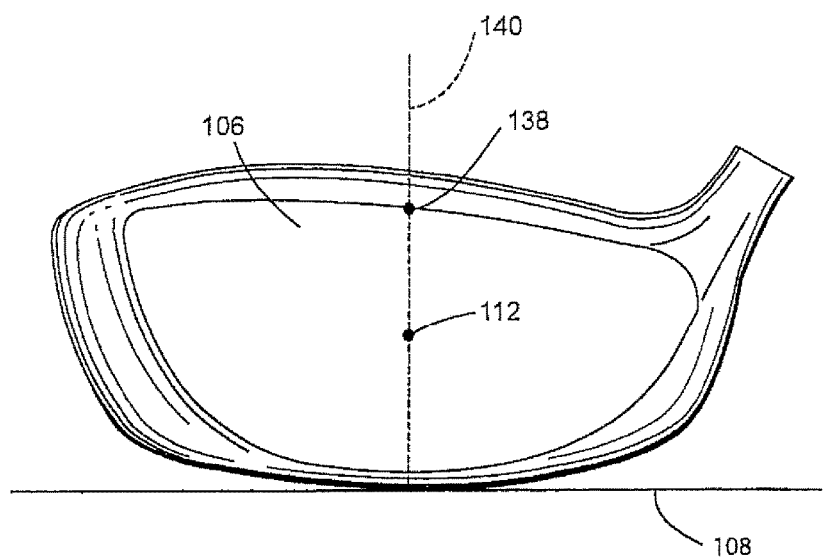
FIG. 11B is a front elevational view of the golf club head of FIG. 11A.
Figure 11C:
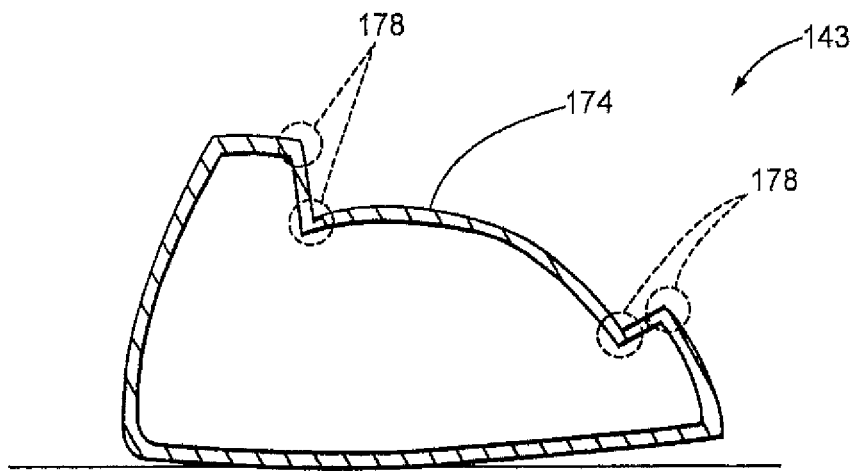
FIG. 11C is a heel side cross-sectional view of an exemplary golf club head in accordance with another aspect of the present invention.
Figure 11D:
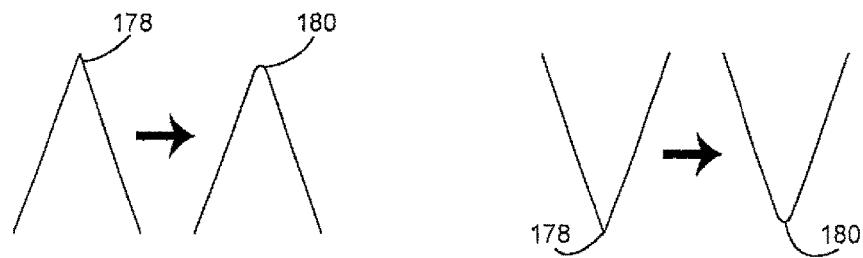
FIG. 11D illustrates a non-arcuate junction of FIGS. 10A-E.
Figure 11E:
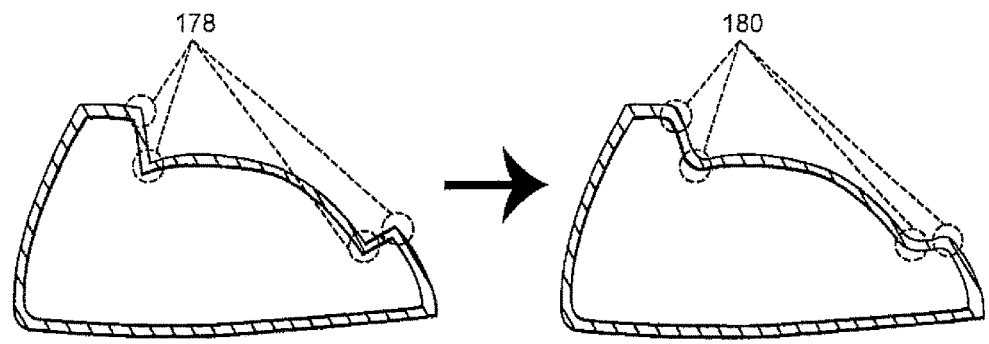
FIG. 11E is a heel side cross-sectional view of the golf club head of FIG. 11C.

Referring to FIGS. 11A and 11B, articulation point 172, as used herein, denotes at least one point along the path 174 where the curvature of the path 174 changes from concave to convex or vice versa. The path 174 is characterized by the intersection of an imaginary vertical plane 140 with the top portion of an exemplary club head 143. As shown in FIG. 11B, the imaginary vertical plane 140 is oriented substantially perpendicular to the face 106 and passes through the face center 112. Referring back to FIG. 11A, path 174 is laterally bounded by the center apex 138 and the rear-most point 149. When determining whether the path 174 changes curvature, it is assumed that all non-arcuate junctions along the path 174 are arcuate. For example, each non-arcuate junction 178 of club head 143, illustrated in FIG. 11C, is substituted with an imaginary junction 180 having an infinitesimally small radius, as shown in FIGS. 11D and 11E.

Figure 12:
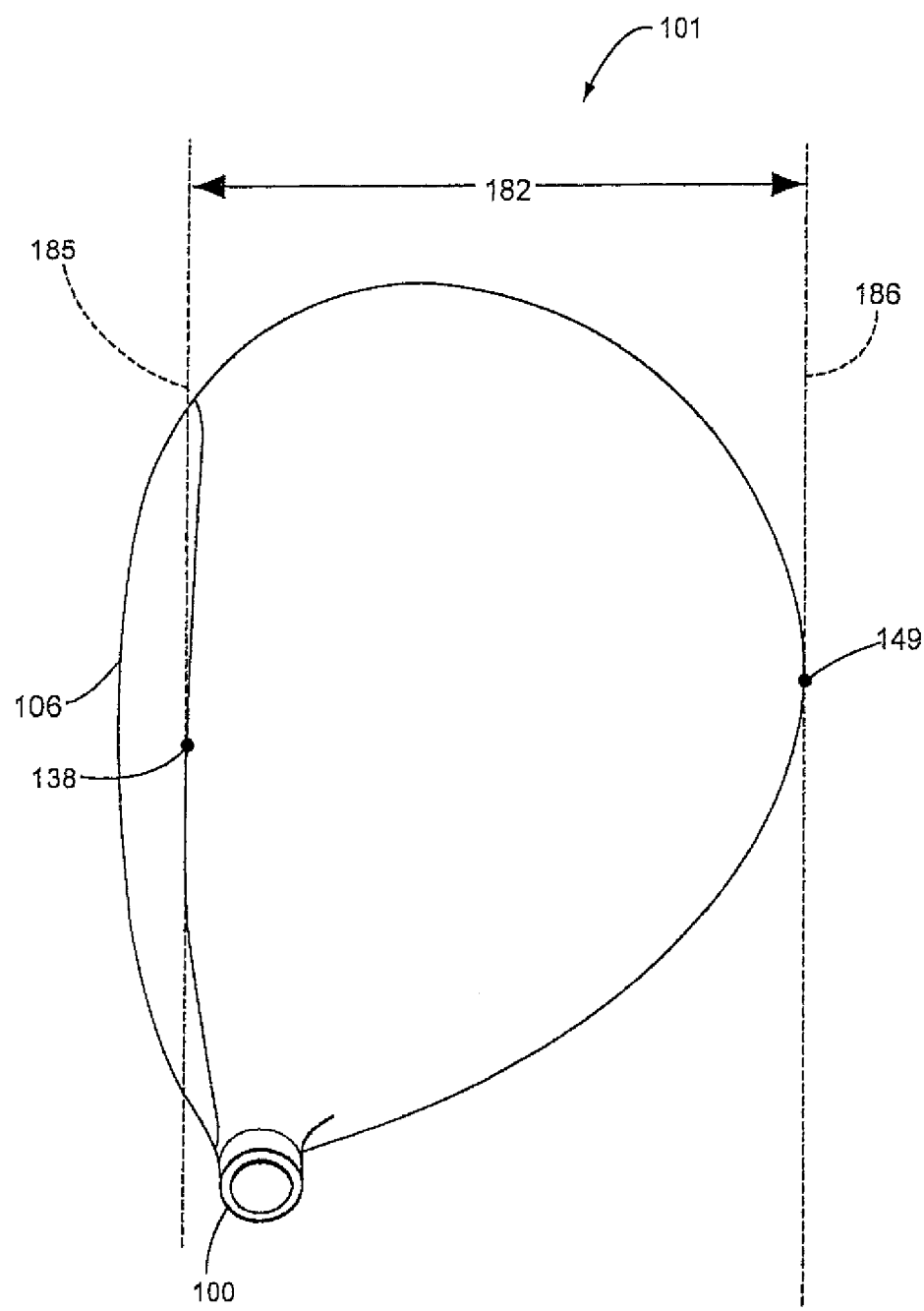
FIG. 12 is a top plan view of the golf club head of FIG. 1

Referring to FIG. 12, overall length 182, as used herein, denotes the shortest horizontal distance between a first imaginary vertical plane 185, substantially parallel to the strike face 106 and passing through the center apex 138, and a second imaginary vertical plane 186 that is parallel to the plane 185 and passes through the rearward most point 149 on the club head 101, opposite the strike face 106.

Figure 13:
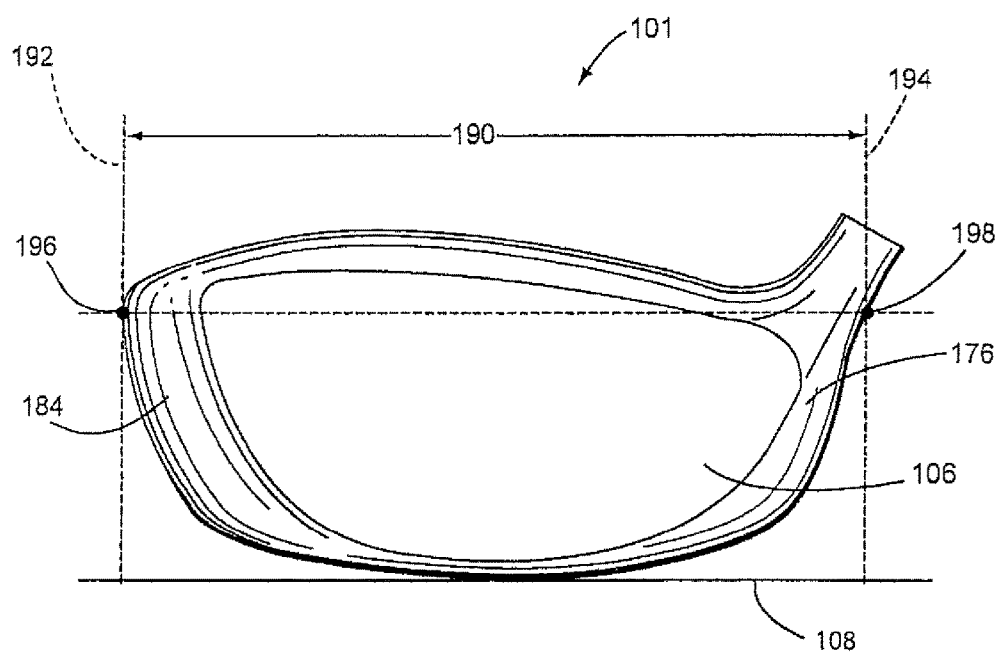
FIG. 13 is a front elevational view of the golf club head of FIG. 1.

Referring to FIG. 13, overall width 190, as used herein, denotes the shortest horizontal distance between a first imaginary vertical plane 192, substantially perpendicular to the strike face 106 and passing through the furthest laterally projecting point 196 of the toe 184, and a second imaginary vertical plane 194 that is substantially perpendicular to the face 106 and passes through the furthest laterally projecting point 198 of the heel 176 having the same height as point 196.

Figure 14:
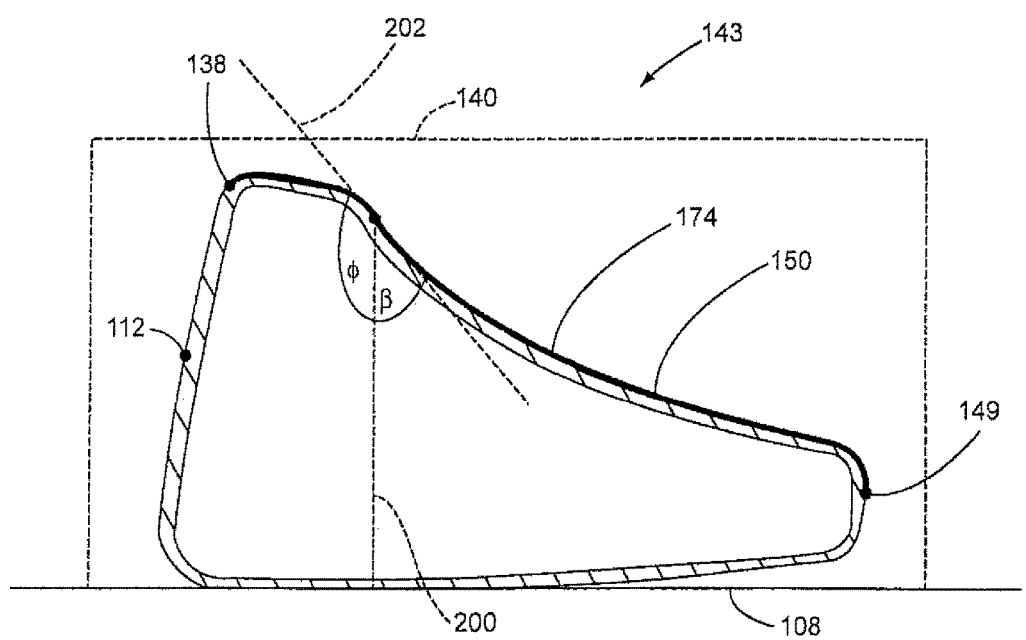
FIG. 14 is a heel side cross-sectional view of the golf club head of FIG. 11A.

Referring to FIG. 14, drop angle $\beta$, as used herein, denotes an angle formed by an imaginary vertical line 200 and a line 202 tangent to the point of intersection between the line 200 and a path 174. The imaginary vertical line 200 extends from the path 174 to ground plane 108 at a specified horizontal distance from the center apex 138, not exceeding the horizontal distance between apex 138 and point 149. The path 174 is characterized by the intersection of an imaginary vertical plane 140 with the top portion of the exemplary club head 143. As shown in FIG. 14, the imaginary vertical plane 140 is oriented substantially perpendicular to the face 106 and passes through the face center 112. Any drop angle $\beta$ is always measured to the right of the vertical line 200 when viewing the club head 143 from a heel side elevational view.

Referring to FIG. 14, recovery angle $\Phi$, as used herein, denotes an angle formed by an imaginary vertical line 200 and a line 202 tangent to the point of intersection between the line 200 and the path 174. The imaginary vertical line 200 extends from the path 174 to ground plane 108 at a specified horizontal distance from the center apex 138, not exceeding the horizontal distance between apex 138 and point 149. Any recovery angle Φ is always measured to the left of the vertical line 200 when viewing the club head from a heel side elevational view.

The term "volume", as used herein, may be determined using the method described in the United States Golf Association and R&A Rules Limited, "Procedure for Measuring the Club Head Size of Wood Clubs," Revision 1.0, Section 5 (Nov. 21, 2003). As described in the Procedure for Measuring the Club Head Size of Wood Clubs, the "volume" is determined by using the following methodology:
 (1) Water is placed in a container large enough to completely immerse a club head without the club head touching the container;
 (2) The filled container is placed on a digital electronic scale that is then tared;
 (3) The club head is slowly lowered into the container until the top of the club head is just below the surface of the water. The hosel of the club head should not be submerged;
 (4) The reading on the electronic scale with the club head submerged as described in step 3, above, is equal to the actual volume of the club head in cubic centimeters.

Referring to FIGS. 1-16 and the tables below, exemplary club heads in accordance with the various embodiments of the present invention are shown and described.

In one aspect of the invention, an improved CG location may be achieved by altering the geometry of the crown, e.g., recessing the crown to increase the available discretionary mass. This increased discretionary mass may be beneficially distributed within the club head to lower the CG. The amount of discretionary mass obtained as a result of geometrically altering the crown may be related to the crown's drop angles (FIG. 14), recovery angles (FIG. 14), average height (FIG. 7), and/or number of articulation points (FIG. 11A). By adapting these variables in accordance with the embodiments of the present invention, an increase in discretionary mass may be achieved.

For example, in FIG. 14, an exemplary club head 143 having a crown recessed toward the ground plane 108 is shown. The crown includes a plurality of drop angles β and recovery angles Φ, i.e. the angles formed by line 200 and tangent line 202 along the path 174 between the center apex 138 and point 149. This improved crown orientation increases the discretionary mass of the club head 143 relative to that of a conventional driver, since less mass is required to form the crown. The amount of discretionary mass created may vary depending on the drop β and recovery angles Φ of the club head. Parameters associated with several exemplary embodiments according to the present invention are listed in Tables 1 and 2, below.

TABLE 1

| Horizontal Distance from Center Apex | Drop Angle, Exemplary Club Head 1 | Drop Angle, Exemplary Club Head 2 |
| --- | --- | --- |
| 2 cm | 77.3° | 74.3° |
| 3 cm | 41.4° | 47.8° |
| 4 cm | 56.7° | 58.2° |
| 5 cm | 68.4° | 63.7° |
| 6 cm | 75.3° | 68.6° |
| 7 cm | 78.9° | 72.7° |
| 8 cm | 81.0° | 76.1° |
| 9 cm | 82.8° | 79.3° |
| 10 cm | 80.1° | 77.9° |

TABLE 2

| Horizontal Distance from Center Apex | Recovery Angle, Exemplary Club Head 1 | Recovery Angle, Exemplary Club Head 2 |
| --- | --- | --- |
| 2 cm | 102.7° | 105.7° |
| 3 cm | 138.6° | 132.2° |
| 4 cm | 123.3° | 121.8° |
| 5 cm | 111.6° | 116.3° |
| 6 cm | 104.7° | 111.4° |
| 7 cm | 101.1° | 107.3° |
| 8 cm | 99.0° | 103.9° |
| 9 cm | 97.2° | 100.7° |
| 10 cm | 99.9° | 102.1° |

In accordance with one aspect of the present invention, club head 143 may have a drop angle β, preferably between about 35° and about 87°, more preferably between about 40° and about 85°, and most preferably between about 50° and 75°, when measured at a horizontal distance between about 2 cm and about 11 cm away from the center apex 138. In another aspect, the drop angle β, may be between about 40° and about 60°, more preferably between about 50° and about 60°, and most preferably between about 41.4° and about 47.8°, when measured at a horizontal distance between about 2 cm and about 4 cm away from the center apex 138. Further, club head 143 may also have a recovery angle Φ, preferably between about 92° and about 145°, and more preferably between about 97° and about 140°, when measured at a horizontal distance between about 2 cm and about 11 cm away from the center apex 138. In another aspect, the recovery angle Φ may be between about 90° and about 110°, when measured at a horizontal distance between about 2 cm and about 4 cm away from the center apex 138. By utilizing drop angles β and recovery angles Φ in the above recited ranges, an increase in discretionary mass may be obtained. The increased discretionary mass may be repositioned low and deep in the club head 143 to improve the CG location, resulting in improved shot accuracy and distance.

Figure 7A:
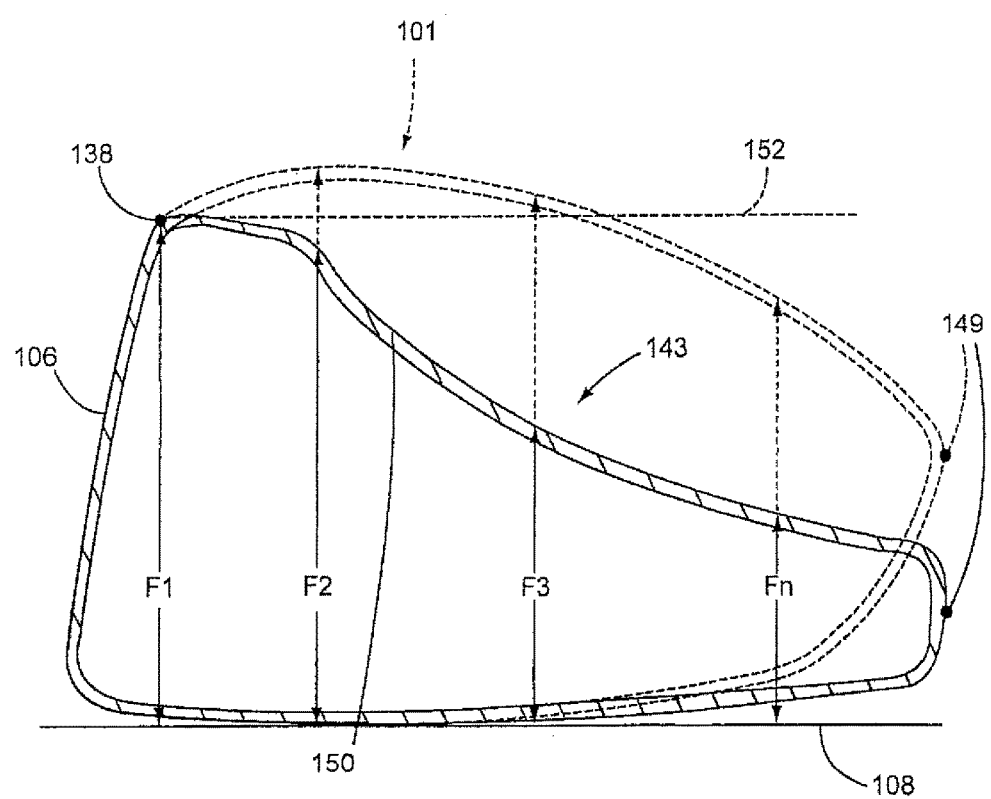
FIG. 7A is a heel side cross-sectional view of the golf club head of FIG. 1 and a second exemplary golf club head in accordance with another aspect of the present invention.

In another embodiment, shown in FIG. 7A, a club head 101 may utilize an average height, i.e. an average of a plurality of vertical distances, e.g. $F_1 \ldots F_n$, between the path 174 and the ground plane 108, adapted to increase the available discretionary mass. For example, by recessing at least a portion of the crown toward the ground plane 108 and thereby lowering the average height relative to that of a conventional driver, less mass is required to form the crown, thus yielding an increase in discretionary mass. Further, vertical distances $F_1 \ldots F_n$ may be spaced anywhere between the apex 138 and the point 149 in increments having any desired progression, e.g., 5 mm increments, as shown in Table 3. Parameters associated with several exemplary embodiments according to the present invention are listed in Table 3.

TABLE 3

| Horizontal Distance from Center Apex [mm] | Height from Path to Ground Plane, Exemplary Club Head 3 [mm] | Height from Path to Ground Plane, Exemplary Club Head 4 [mm] |
| --- | --- | --- |
| 0 @ center apex | 57.1 | 61.2 |
| 5 | 58.5 | 62.6 |
| 10 | 57.9 | 62.2 |
| 15 | 57.1 | 61.3 |
| 20 | 55.2 | 60.1 |
| 25 | 48.7 | 54.4 |
| 30 | 42.7 | 49.5 |
| 35 | 38.6 | 45.2 |

TABLE 3-continued

| Horizontal Distance from Center Apex [mm] | Height from Path to Ground Plane, Exemplary Club Head 3 [mm] | Height from Path to Ground Plane, Exemplary Club Head 4 [mm] |
|---|---|---|
| 40 | 35.1 | 41.9 |
| 45 | 32.6 | 39.4 |
| 50 | 30.5 | 36.6 |
| 55 | 28.9 | 34.4 |
| 60 | 27.7 | 32.1 |
| 65 | 26.4 | 30.4 |
| 70 | 25.5 | 28.8 |
| 75 | 24.7 | 27.3 |
| 80 | 23.8 | 26.0 |
| 85 | 23.1 | 24.9 |
| 90 | 22.1 | 23.8 |
| 95 |  | 23.0 |
| 100 |  | 22.2 |
| Avg. Ht. | 37.7 | 40.4 |

In accordance with another aspect of the present invention, exemplary club head 143 may have an average height, preferably between about 35 mm and about 45 mm, more preferably between about 36 mm and about 41 mm, and most preferably between about 37.7 mm and about 40.4 mm. The increased discretionary mass created by utilizing the exemplary average heights, recited above, may be redistributed in the club head 143 to improve the mass properties thereof.

In another embodiment of the invention, shown in FIG. 11A, a club head 143 including at least one articulation point 172 along a path 174, has an increased discretionary mass. By utilizing a specified number of articulation points 172, a crown shape conducive to a favorable weight distribution may be achieved. For example, as illustrated in FIG. 11A, a recessed crown 150 may be created by incorporating two articulation points 172. The recessed shape of the crown may be adapted to increase the available discretionary mass by decreasing the mass required to form the crown. Such weight may be repositioned in club head 143 to increase the MOI or to place the CG in a more favorable position. This may allow for a more forgiving club head, resulting in improved shot accuracy and distance.

Figure 6A:
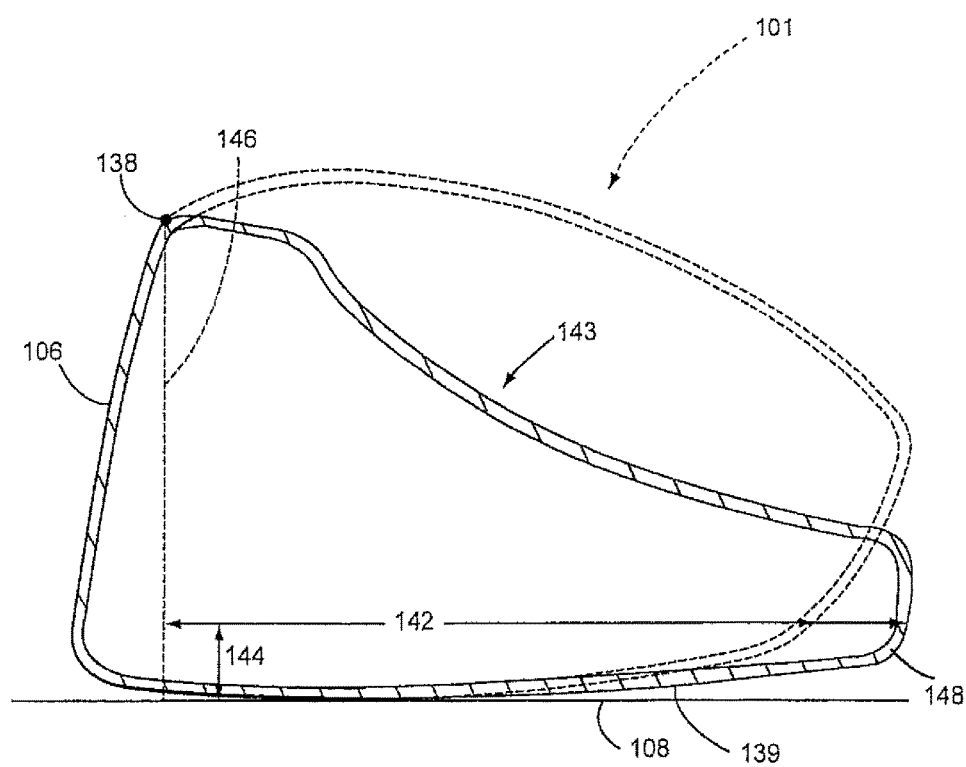
FIG. 6A is a heel side cross-sectional view of the golf club head of FIG. 1 and a second exemplary golf club head in accordance with another aspect of the present invention.

Improved placement of the CG may be generally accomplished by depositing the increased discretionary mass, i.e., the mass obtained by utilizing drop angles, recovery angles, average heights, and articulation points according to the embodiments of the present invention, as low and deep as possible in the exemplary club head 143. As shown in FIG. 6, conventional club heads, e.g., club head 101, are limited in their ability to place discretionary weight low and deep due to the geometry of the sole 141. The soles, e.g., sole 141, of conventional club heads are generally elevated with respect to the ground plane 108, which prevents discretionary mass from being deposited as close as possible to the ground plane 108. Thus, in another aspect of the invention, shown in FIG. 6A, a sole 139, having the break length 142 near the ground plane 108, may be utilized to position the increased discretionary mass as low and deep as possible in the exemplary club head 143. Parameters associated with an exemplary embodiment according to the present invention are listed in Table 4.

TABLE 4

| Vertical distance up from GP [mm] | Break Length, Exemplary Club Head 5 [mm.] |
|---|---|
| 1 | 53.6 |
| 2 | 69.9 |
| 3 | 81.3 |
| 4 | 90.7 |
| 5 | 99.1 |
| 6 | 101.1 |
| 7 | 102.1 |
| 8 | 102.6 |
| 9 | 103.1 |
| 10 | 103.4 |
| 11 | 103.6 |
| 12 | 103.6 |
| 13 | 103.9 |
| 14 | 103.9 |
| 15 | 103.9 |
| 16 | 103.9 |
| 17 | 103.9 |
| 18 | 103.9 |
| 19 | 103.6 |
| 20 | 103.1 |
| 21 | 102.6 |
| 22 | 101.3 |
| 23 | 98.3 |

In some embodiments of the present invention, club head 143 may have a break length 142 between about 50 mm and about 110 mm at the vertical height 144 between about 1 mm and about 15 mm relative to the ground plane 108. The break length 142, may be, preferably, between about 90 mm and about 110 mm, more preferably between about 96.5 mm and about 140 mm, and most preferably, between about 100 mm and about 130 mm at a vertical height 144 between about 5 mm and about 10 mm relative to the ground plane 108. The break length 142 in accordance with the embodiments of the present invention, allows discretionary mass to be placed low and deep within the club head 143, yielding an improved CG location.

Figure 15:
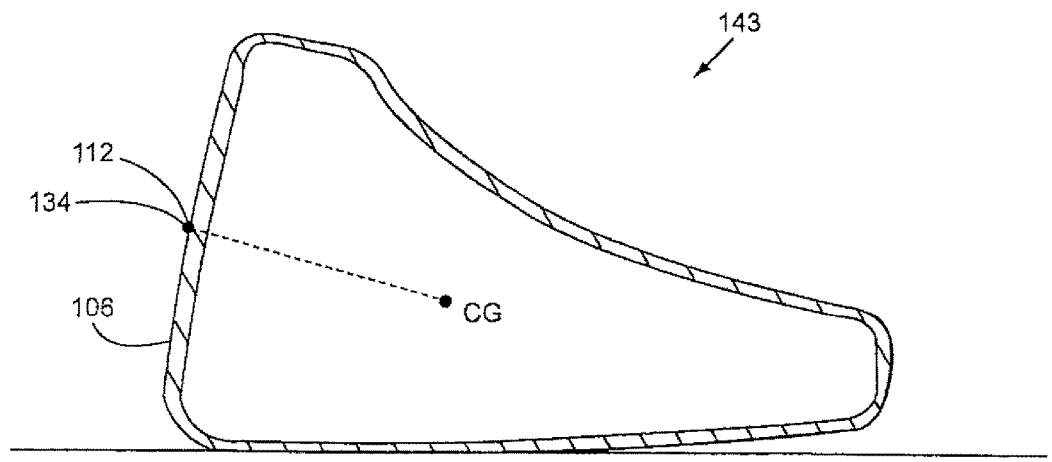
FIG. 15 is a heel side cross-sectional view of the golf club head of FIG. 11A.

Referring to FIGS. 4 and 15, in another aspect of the present invention, the increased discretionary mass may be positioned low in the club head 143, e.g., by utilizing the break length 142 so that the sweet spot 134 is substantially aligned with the COR "hot spot", i.e., the face center 112. By lowering the CG and aligning the sweet spot 134 with the COR "hot spot" 112, the benefits of these performance variables, i.e., the increased shot distance associated with the COR "hot spot" 112 and increased accuracy associated with the "sweet spot" 134, may be realized simultaneously. Thus, the club head 143, providing improved shot accuracy and distance, may be achieved.

Referring again to FIG. 15, another aspect of the present invention is to position the discretionary mass deep within the club head 143, e.g., by utilizing the break length 142, to increase the CG depth, i.e., the horizontal distance from the CG to the strike face 106. The exemplary club head 143, having a CG with such an increased depth, dynamically flexes the shaft toward alignment with the CG to loft the head 143 and to close the face 106 at impact with the ball. Additionally, the deep CG of club head 143 may increase the radius of rotation of the face 106 on off-center hits, thus improving shot accuracy.

CG location coordinates associated with several exemplary embodiments according to the present invention are listed in Table 5.

TABLE 5

| CG Location | Exemplary Club Head 6 | Exemplary Club Head 7 | Exemplary Club Head 8 |
|---|---|---|---|
| First Horizontal Distance | 19.6 mm | 31.0 mm | 28.2 mm |
| Second Horizontal Distance | 62.2 mm | 63.0 mm | 70.6 mm |
| First Vertical Distance | 26.2 mm | 27.4 mm | 28.7 mm |

Figure 3C:
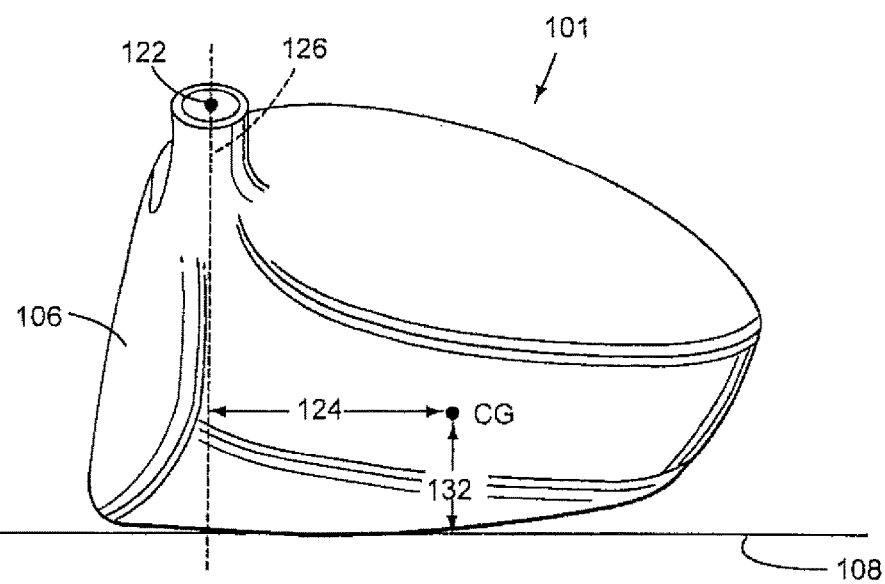
FIG. 3C is a heel side elevational view of the golf club head of FIG. 1.

Referring to FIGS. 3B and 3C as well as Table 5, in some embodiments of the present invention, first horizontal distance 124 may preferably be between about 12 mm and about 38 mm, more preferably between about 15 mm and about 36 mm, and most preferably between about 25 mm and about 35 mm. Second horizontal distance 128 may preferably be between about 55 mm and about 78 mm, more preferably between about 58 mm and about 74 mm, and most preferably between about 58 mm and about 66 mm. First vertical distance 132 may preferably be between about 20 mm and about 33 mm, more preferably between about 20 mm and about 28 mm, more preferably between about 22 mm and about 30 mm, and most preferably between about 25 mm and about 30 mm.

In addition to improving the CG location, some discretionary weight may be repositioned in the face to make the face taller and wider. A large face, for example, may instill increased confidence in a golfer. Such improved confidence may result in increased club head speed, which may improve overall ball carry. Furthermore, some discretionary weight may also be strategically positioned around the rear portion of the shell. This may increase the MOI about the vertical ($I_{zz}$) and horizontal ($I_{yy}$) axes and may ultimately improve performance on off center hits by reducing slice/hook tendencies.

Table 6 lists moment of inertia, face height, and face length measurements for several exemplary embodiments according to the present invention:

TABLE 6

| Measurement | Exemplary Club Head 6 (CH6) | Exemplary Club Head 7 (CH7) | Exemplary Club Head 8 (CH8) |
|---|---|---|---|
| $I_{yy}$ | 2486 g · cm² | 3149 g · cm² | 2866 g · cm² |
| $I_{zz}$ | 3878 g · cm² | 4538 g · cm² | 4394 g · cm² |
| Face Height | 49.3 mm | 52.6 mm | 54.6 mm |
| Face Length | 101.3 mm | 104.9 mm | 105.7 mm |

Referring to FIG. 1B and Table 6, in some embodiments of the present invention, $I_{yy}$ may preferably be at least about 2300 g·cm², more preferably be between about 2300 g·cm² and about 3300 g·cm², and most preferably be between about 2700 g·cm² and about 3300 g·cm². $I_{zz}$ may preferably be at least about 3700 g·cm², more preferably be between about 3700 g·cm² and about 4700 g·cm², or most preferably be between about 3800 g·cm² and about 4600 g·cm².

Referring to FIGS. 8 and 9, as well as Table 6, in some embodiments of the present invention, the face height 154 may preferably be between about 43 mm and about 61 mm, more preferably between about 45 mm and about 58 mm, and most preferably between about 48 mm and about 58 mm. The face length 164 may preferably be between about 94 mm and about 115 mm, more preferably between about 96 mm and about 112 mm, and most preferably between about 98 mm and about 110 mm.

Figure 16:
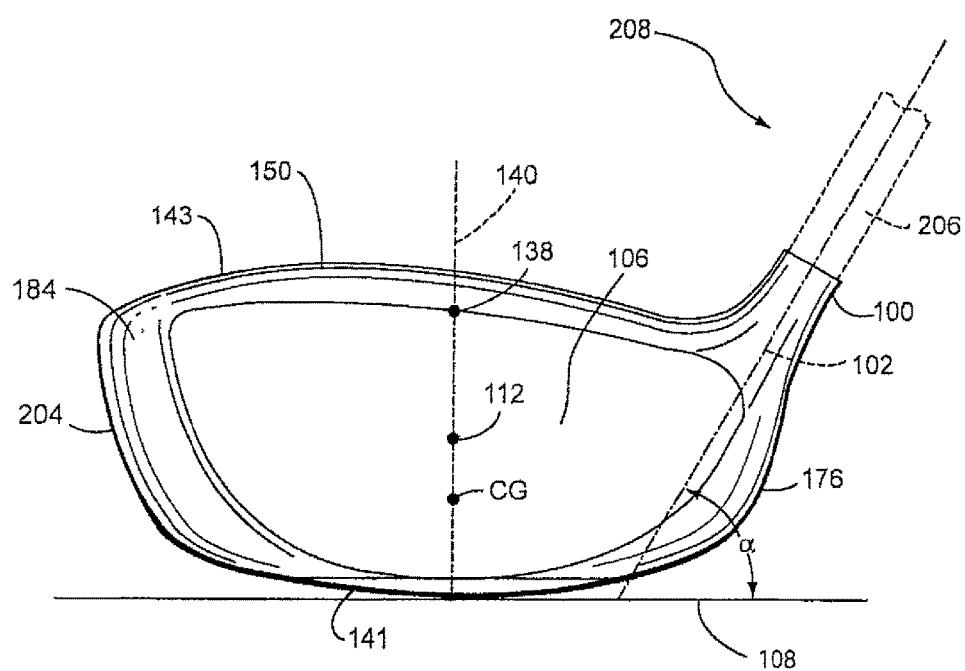
FIG. 16 is a heel side elevational view of the golf club head of FIG. 11A.

Referring to FIG. 16, an exemplary golf club 208, shown with the wood-type club head 143, may include a shaft 206, connected to a head 143 by a hosel 100. Head 143, may include a hollow shell formed by the strike face 106 and a body portion 204. The hollow shell may have the heel portion 176, the toe portion 184, the crown portion 150, and the sole portion 141.

Further, head 143 may be formed from a wide variety of materials, including metals, polymers, ceramics, composites, and wood. For instance, the club heads of the present invention may be made from stainless steel, titanium, or graphite fiber-reinforced epoxy, as well as persimmon or laminated maple. In one exemplary embodiment, club head 143 is formed, at least in part, of fiber-reinforced or fiberglass-reinforced plastic (FRP), otherwise known as reinforced thermoset plastic (RTP), reinforced thermoset resin (RTR), and glass-reinforced plastic (GRP).

In one preferred exemplary embodiment, the body portion 204 may be provided with the face 106 formed of SP700 Beta Titanium —an alpha/beta grade alloy of 4.5-3-2-2 Titanium (Ti-4.5% Al-3% V-2% Mo-2% Fe). In alternate embodiments, portions of head 143 may be formed of other titanium alloys including a forging of a high strength titanium alloy such as 10-2-3 (Ti-10% V-2% Fe-3% Al) or 15-3-3-3(Ti-15% V-3% Cr-3% Sn-3% Al), a casting of a 6-4 alloy (Ti-6% Al-4% V), or other titanium alloys such as 3-2.5 Titanium (Ti-3% Al-2.5% V) or 15-5-3 Titanium (Ti-15% Mo-5% Zr-3% Al). In other embodiments, other forging and casting alloys may be used including stainless steel and aluminum.

In some embodiments, the volume of the club head may be at least about 200 cm³, more preferably between about 300 cm³ and about 500 cm³; and most preferably between about 310 cm³ and about 400 cm³.

A variety of club shafts are contemplated for use with the various embodiments of the present invention, including the shafts 206 that, for example, may be made from chrome-plated steel, stainless steel, aluminum, carbon or graphite fiber-reinforced epoxy, boron fiber-reinforced epoxy, or titanium. The shaft 206 may be provided with a grip, for example, formed from molded synthetic rubber or wrapped leather.

In addition, the present invention may relate to a golf club and a set of golf clubs having the inventive golf club heads described herein. For example, the set may be a set of wood-type golf clubs which may have metallic golf club heads.

While various aspects of the present invention are described above, it should be understood that the various features of the invention may be used singly or in any combination thereof. Therefore, this invention is not to be limited to only the specifically preferred embodiments depicted herein. Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

The invention claimed is:

1. A golf club head that, when oriented in a reference position, comprises:
   a strike face comprising a face center and a center apex;
   a top portion having an exterior surface;
   a bottom portion opposite the top portion;

a first imaginary vertical plane perpendicular to the strike face and passing through the face center; and a path defined by the intersection between the first imaginary vertical plane and the exterior surface of the top portion, the path having a first non-arcuate junction and a second non-arcuate junction rearward of the first non-arcuate junction such that a portion of the path is located therebetween, the portion of the path being associated with a drop angle between about 40° and about 60° measured at a location horizontally and rearwardly spaced from the center apex by between about 2 cm and about 4 cm.

2. The golf club head of claim 1, wherein the drop angle is between 41.4° and 47.8°.

3. The golf club head of claim 1, further comprising:
a hosel, associated with the body portion, having a hosel center;
a second imaginary vertical plane perpendicular to the first imaginary vertical plane and including the hosel center; and
a center of gravity located a first horizontal distance of between about 25 mm and about 35 mm, from the second imaginary vertical plane.

4. The golf club head of claim 1, further comprising a moment of inertia about a vertical axis passing through the center of gravity of at least 3700 g·cm².

5. The golf club head of claim 1, wherein the golf club head has a volume of at least 200 cm³.

6. The golf club head of claim 5, wherein the volume is between about 300 cm³ and about 500 cm³.

7. The golf club head of claim 1, wherein the strike face further includes a sweet spot substantially coincident with the face center.

8. The golf club head of claim 1, further comprising:
in the first imaginary vertical plane, an imaginary vertical line passing through the center apex; and
a break length between about 90 mm and about 110 mm, measured with respect to the imaginary vertical line at a vertical height between about 5 mm and about 10 mm.

9. The golf club head of claim 1, further comprising:
in the first imaginary vertical plane, an imaginary vertical line passing through the center apex; and
a break length between about 100 mm and about 130 mm, measured with respect to the imaginary vertical line at a vertical height between about 5 mm and about 10 mm.

10. A golf club head that, when oriented in a reference position, comprises:
a strike face comprising a face center and a center apex;
a top portion having an exterior surface;
a bottom portion opposite the top portion;
a first imaginary vertical plane perpendicular to the strike face and passing through the face center, wherein, in the first imaginary vertical plane, an imaginary vertical line passing through the center apex;
a path defined by the intersection between the first imaginary vertical plane and the exterior surface of the top portion, the path having a first non-arcuate junction and a second non-arcuate junction rearward of the first non-arcuate junction such that a portion of the path is located therebetween, the portion of the path being associated with a drop angle between about 40° and about 60° ; and
a break length between about 90 mm and about 110 mm, measured with respect to the imaginary vertical line at a vertical height between about 5 mm and about 10 mm.

11. The golf club head of claim 10, wherein the drop angle is between 41.4° and 47.8°.

12. The golf club head of claim 10, further comprising:
a hosel, associated with the body portion, having a hosel center;
a second imaginary vertical plane perpendicular to the first imaginary vertical plane and including the hosel center; and
a center of gravity located a first horizontal distance from the second imaginary vertical plane of between about 25 mm and about 35 mm.

13. The golf club head of claim 10, further comprising a moment of inertia about a vertical axis passing through the center of gravity of at least 3700 g·cm².

14. The golf club head of claim 10, wherein the golf club head has a volume of at least 200 cm³.

15. The golf club head of claim 14, wherein the volume is between about 300 cm³ and about 500 cm³.

16. The golf club head of claim 10, wherein the strike face further includes a sweet spot substantially coincident with the face center.

* * * * *